(12) United States Patent
Sayar et al.

(10) Patent No.: US 12,547,482 B1
(45) Date of Patent: Feb. 10, 2026

(54) CLOUD-BASED ACTIONS SERVICE FOR A DATA INTAKE AND QUERY SYSTEM

(71) Applicant: Cisco Technology, Inc., San Jose, CA (US)

(72) Inventors: Matthew Sayar, Colorado Springs, CO (US); Atif Mahadik, Fremont, CA (US); Anne Yeh, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 393 days.

(21) Appl. No.: 17/729,781

(22) Filed: Apr. 26, 2022

(51) Int. Cl.
*G06F 9/54* (2006.01)

(52) U.S. Cl.
CPC ............. *G06F 9/547* (2013.01); *G06F 9/546* (2013.01)

(58) Field of Classification Search
None
See application file for complete search history.

(56) References Cited

U.S. PATENT DOCUMENTS

| | | | |
|---|---|---|---|
| 7,937,344 B2 | 5/2011 | Baum et al. | |
| 8,112,425 B2 | 2/2012 | Baum et al. | |
| 8,751,529 B2 | 6/2014 | Zhang et al. | |
| 8,788,525 B2 | 7/2014 | Neels et al. | |
| 9,215,240 B2 | 12/2015 | Merza et al. | |
| 9,286,413 B1 | 3/2016 | Coates et al. | |
| 10,127,258 B2 | 11/2018 | Lamas et al. | |
| 11,157,497 B1* | 10/2021 | Batsakis | ........... G06F 16/24539 |
| 2009/0193132 A1* | 7/2009 | Plewnia | ................... G06F 9/546 709/230 |
| 2009/0307351 A1* | 12/2009 | Raja | ........................ H04L 67/56 709/224 |
| 2016/0112536 A1* | 4/2016 | Ahmed | ................... G06Q 30/08 709/219 |
| 2018/0013785 A1* | 1/2018 | Satish | ................. H04L 63/1416 |
| 2018/0084086 A1* | 3/2018 | Newman | ................. H04L 67/55 |
| 2019/0095226 A1* | 3/2019 | Saunders | ................... G06F 8/61 |
| 2019/0098106 A1 | 3/2019 | Mungel et al. | |
| 2019/0236203 A1* | 8/2019 | De Boer | .................... G06F 9/54 |
| 2020/0301677 A1* | 9/2020 | Burman | ................... G06F 9/451 |
| 2020/0301678 A1* | 9/2020 | Burman | ................... G06F 9/541 |
| 2023/0168949 A1* | 6/2023 | De Souter | ............... G06F 9/547 719/328 |

OTHER PUBLICATIONS

Splunk Enterprise 8.0.0 Overview, available online, retrieved May 20, 2020 from docs.splunk.com.

(Continued)

*Primary Examiner* — Umut Onat
(74) *Attorney, Agent, or Firm* — Kilpatrick Townsend & Stockton LLP

(57) ABSTRACT

Techniques are described for using a cloud-based actions service to provide IT and security-related applications with a centralized interface for requesting the performance of a wide range of actions involving third party services and devices. Any application with the ability to send API requests to the actions service can thus request the invocation of actions supported by the service without the need for independent implementations of such actions. Furthermore, the actions service provides a source for a continuously evolving set of actions with only minimal changes needed to applications desiring to use new and updated actions.

20 Claims, 9 Drawing Sheets

(56) References Cited

OTHER PUBLICATIONS

Splunk Cloud 8.0.2004 User Manual, available online, retrieved May 20, 2020 from docs.splunk.com.
Splunk Quick Reference Guide, updated 2019, available online at https://www.splunk.com/pdfs/solution-guides/splunk-quick-reference-guide.pdf, retrieved May 20, 2020.
Carasso, David, "Exploring Splunk," published by CITO Research, New York, NY, Apr. 2012.
Bitincka, Ledion et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010.

\* cited by examiner

CLOUD-BASED ACTIONS SERVICE FOR A DATA INTAKE AND QUERY SYSTEM

RELATED APPLICATIONS

Any and all applications for which a foreign or domestic priority claim is identified in the Application Data Sheet as filed with the present application are incorporated by reference under 37 CFR 1.57 and made a part of this specification.

BACKGROUND

Monitoring the operation and security of even a moderately complex computing environment typically involves a large number of tasks including, for example, investigating alerts generated by various operational and security monitoring applications, performing tasks to detect, triage, and respond to identified threats, and the like. To aid users and organizations with these and other tasks, some data intake and query systems provide users with a range of information technology (IT) and security-related applications (such as, e.g., security intelligence management services, Security Orchestration, Automation, and Response (SOAR) applications enterprise security applications, etc.). These applications broadly enable users to automatically monitor, detect, and investigate IT and security-related incidents, to automate repetitive tasks, and to strengthen defenses by connecting and coordinating complex workflows across security analyst teams and tools.

BRIEF DESCRIPTION OF THE DRAWINGS

Illustrative examples are described in detail below with reference to the following figures.

DETAILED DESCRIPTION

Figure 1:
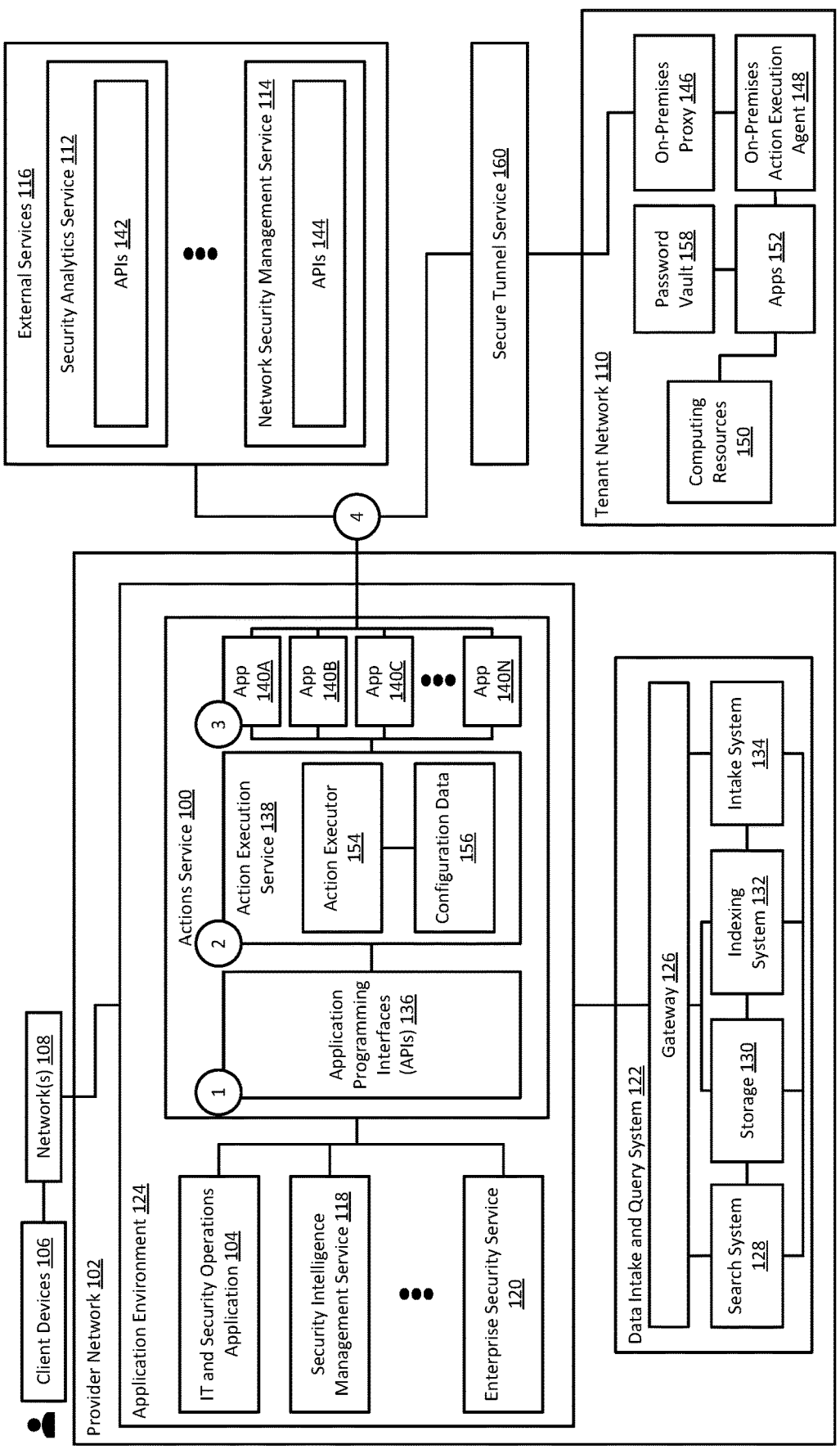
FIG. 1 is a block diagram of an example computing environment including a cloud-based actions service providing a centralized API that a data intake and query system, and applications associated with a data intake and query system, can use to integrate with third party services and devices according to some examples.

The present disclosure relates to methods, apparatus, systems, and non-transitory computer-readable storage media for a cloud-based app integration layer, also referred herein to as an actions service. The actions service can be used by a data intake and query system, as well as by IT and security-related applications integrated with the data intake and query system, as a centralized service used to invoke actions involving integrations with a wide range of third-party services or devices (e.g., external security analytics services, network security management services, on-premises network and security devices, and the like).

Today, some data intake and query systems provide a range of IT and security-related applications designed to assist users and organizations with monitoring and detecting operational and security-related incidents in their IT environments, obtaining and managing security intelligence data, automating incident response actions, and the like. Many of these applications implement features that enable integrations with external, third-party services and devices to perform certain types of response actions, to ingest intelligence data from external data sources, among many other possible types of actions. These integrations presently are implemented independently for each application by respective development teams and, as such, any given application is generally unable to directly invoke actions implemented by other applications. However, many of these applications perform similar types of actions and could benefit from a single point of access to the actions and could further benefit from access to additional types of actions supported by other applications.

Furthermore, maintaining and periodically improving the integrations supported by each of the applications presents several challenges. For example, developers of each application might frequently modify the application code, sometimes referred to herein as apps, used to integrate with external services and devices to correct bugs or to add functionality over time, resulting in periodic redeployments of entire applications. Development teams working on separate applications with similar types of integrations might also often duplicate efforts to update the integrations, e.g., responsive to application programming interface (API) changes at the external services or devices or to correct other issues. The frequent updates and redeployments of the applications in this manner can be error-prone and is not highly scalable as the number of integrations increases over time.

To address these challenges, among others, techniques are described herein for using a cloud-based actions service to provide IT and security-related applications with a centralized interface (e.g., including a single set of APIs) for requesting the performance of a wide range of actions involving third party services and devices. Any application with the ability to send API requests to the actions service can thus request the invocation of actions supported by the service without the need for independent implementations of such actions. Furthermore, the actions service provides a source for a continuously evolving set of actions with only minimal changes needed to applications desiring to use new and updated actions. The actions service can thereby deduplicate separate implementations of similar actions across multiple applications, further reducing development effort, maintenance, and application deployment logistics. The implementation of the actions service using cloud-based resources also enables efficient application modernization opportunities such as, e.g., by executing action invocations using on-demand executable functions (e.g., using the AWS Lambda™ or Azure Functions™ "serverless" computing services), deployable containers, or other cloud-based resources.

FIG. 1 is a block diagram of an example computing environment including a cloud-based actions service providing a centralized API that a data intake and query system, and applications associated with a data intake and query system, can use to integrate with third party services and devices. In FIG. 1, an actions service 100 comprises software components executed by one or more electronic computing devices. In some examples, the computing devices and resources are provided and managed in part by a cloud provider network 102 (e.g., as part of a shared computing resource environment). In other examples, at least part of the actions service 100 executes on computing devices managed within an on-premises datacenter or other computing environment, or on computing devices located within a combination of cloud-based and on-premises computing environments.

The actions service 100 enables many different types of IT and security-related applications, or more generally any type of application desiring to integrate with external services or devices, to request the execution of actions involving those services or devices. As one example, an IT and security operations application 104 broadly enables users to perform security orchestration, automation, and response operations involving components of an organization's computing infrastructure (or components of multiple organizations' computing infrastructures). Among other benefits, an IT and security operations application 104 enables security teams and other users to automate repetitive tasks, to efficiently respond to security incidents and other operational issues, and to coordinate complex workflows across security teams and diverse IT environments. For example, users associated with various IT operations or security teams (sometimes referred to as "analysts") can use client computing devices 106 to interact with an IT and security operations application 104 via one or more network(s) 108 to perform operations relative to IT environments for which they are responsible (such as, for example, a tenant network 110). In general, any number of separate security teams can concurrently use the IT and security operations application 104 to manage any number of respective tenant networks, where an individual security team may be responsible for one or more tenant networks. In this example, operation of the IT and security operations application 104 can involve invoking actions to obtain security analytics (e.g., from a security analytics service 112, a network security management service 114, or other external service 116), requesting the performance of actions involving external devices (e.g., computing resources 150 located in an external tenant network 110, where such actions can be executed via apps 152 by an on-premises action execution agent 148, optionally using data obtained from a password vault 158), among other possible actions.

As another examples, a security intelligence management service 118 is a type of security automation service that periodically collects data from external services 116 and processes the data for further enrichment and analysis. These external services and data sources can include, e.g., various types of intelligence feeds and services related to computer security threats and other types of computing environment operational information. The intelligence data obtained from such sources can include enrichment information used to provide the security intelligence management service 118, or other downstream applications and services (e.g., an IT and security operations application 104, an enterprise security service 120, etc.), with additional information (e.g., identifiers, threat scores, etc.) about IP addresses, files, malware indicators, and the like. The security intelligence management service 118 typically communicates with these external services 116 using third-party APIs or other interfaces provided by the various data sources. The number of data sources with which the security intelligence management service 118 is integrated can number in the tens, hundreds, or more, and the service can add support for additional external and internal data sources over time.

As yet another examples, an enterprise security service 120 represents a security information and event management (SIEM) solution that enables security teams to quickly detect and respond to security incidents, to gain organization-wide visibility and security intelligence, among other features. In each of these examples, many of the actions performed by the services involving external services and devices can be provided instead by the actions service 100, as described in more detail herein, to provide for a centralized implementation of the integrations.

In some examples, client devices 106 can communicate with various IT operations and security-related applications, and with a data intake and query system 122, in a variety of ways such as, for example, over an internet protocol via a web browser or other application, via a command line interface, via a software developer kit (SDK), and the like. An application environment 124 broadly includes tools, software modules (e.g., computer executable instructions to perform a particular function), etc., that enable application developers to create computer executable applications and services to interface with a data intake and query system 122. Applications and services can use aspects of the application environment 124 to interface with the data intake and query system 122 to obtain relevant data, process the data, and display it in a manner relevant to a particular application context. The applications and services can further include additional backend services, middleware logic, front-end user interfaces, data stores, and other computing resources, and provides other facilities for ingesting use case specific data and interacting with that data, as described elsewhere herein.

As an example of using the application environment 124, a security intelligence management service 118 can include custom web-based interfaces that optionally leverage one or more user interface components and frameworks provided by the application environment 124. The security intelligence management service 118 further includes middleware business logic implemented on a middleware platform of the developer's choice. Furthermore, in some examples, a security intelligence management service 118 is instantiated and executed in a different isolated execution environment relative to the data intake and query system 122. As a non-limiting example, in examples where the data intake and query system 122 is implemented at least in part in a Kubernetes cluster, portions of the security intelligence management service 118 can execute in a different Kubernetes cluster (or other isolated execution environment system) and interact with the data intake and query system 122 via the gateway 126 (e.g., to access other services such as a search system 128, storage 130, an indexing system 132, intake system 134, etc.). The IT and security operations application 104, enterprise security service 120, and actions service 100 can similarly each execute in one or more isolated execution environments. Additional details related to a data intake and query system 122 are described elsewhere herein.

In some examples, the actions service 100 includes APIs 136, an action execution service 138, and any number of apps 140A-140N. As indicated, the actions service 100 broadly provides a set of APIs that enable applications to request the execution of actions involving services and devices external to the actions service 100 (e.g., external services 116, other services of the provider network 102, devices within a tenant network 110 or other external computing environment, etc.).

As shown in FIG. 1, each of the external services and devices with which the actions service 100 integrates can implement their own respective set of APIs (e.g., such as APIs 142 provided by a security analytics service 112, APIs 144 provided by a network security management service 114, APIs supported by an on-premises proxy 146 and on-premises action execution agent 148 used to interact with devices in a tenant network 110, etc.). To enable integration with a diverse, changing, and ever-growing collection of external services and the devices, the actions service 100 supports a modular set of apps 140A-144N, where each app includes application code implementing an interface with one or more particular types of services or devices. For example, one of the apps 140A-140N might include application code for communicating with APIs 142 of a security analytics service 112, another one of the apps might include application code for communicating with APIs 144, while another app includes application code for communicating with a particular type of network device located in tenant networks 110. In some examples, an app conforms to a standardized app structure including application code that extends one or more base classes provided by the actions service 100, particular types of metadata used by the actions service 100 to deploy and execute the app, among other components that enable the actions service 100 to execute the apps on-demand.

In some examples, an app implements one or more invokable actions that can be executed against an external service or device with which the app is designed to integrate. For example, an app created to integrate with a security analytics service 112 might include a first action which, upon execution, requests a security score for a Uniform Resource Link (URL), a second action which requests a security score for a file hash, a third action for reporting a known malicious file or URL, and the like. To perform these actions, the apps can in part generate requests using the APIs or other interfaces provided by the external services or devices to obtain the desired information or to cause desired actions to be performed and can further return response information to the action execution service 138 for delivery to one or more downstream applications.

In some examples, the APIs 136 of the actions service 100 include application logic that interprets requests received by the actions service 100 (e.g., by analyzing a URL associated with the request and optionally other request parameters), causes an action execution service 138 to schedule execution of one or more corresponding actions by one or more corresponding apps 140A-140N, and returns a response to a requesting application. For example, the requests received by the actions service 100 can specify one or more actions (e.g., actions implemented by one or more of apps 140A-140N) that a requesting application desires for the actions service 100 to execute on behalf of the application. As described in more detail elsewhere herein, the actions service 100 can optionally cache the results of some action requests and the service can respond to repeated requests (e.g., requests specifying a same action and, if applicable, the same action parameters) with the cached results data. In some examples, a response can include an action run identifier that the actions service 100 generates for the request and that the requesting application can use to obtain status and results information based on the execution of the requested action. In other examples, the actions service 100 can return results information for more synchronous types of action requests.

In some examples, the action execution service 138 includes, among other possible components, an action executor 154 and configuration data 156, collectively responsible for managing the execution of application code (e.g., stored as apps 140A-140N) used to perform requested actions. The action executor 154 broadly receives requests interpreted by the APIs 136, identifies one or more apps from apps 140A-140N associated with application code that can be executed to perform the requested operations, obtains configuration data 156 to be used during execution of the action (e.g., account information used to authenticate with an external service or device, API keys to be used in API requests, etc.), schedules a time at which to execute the action (e.g., either immediately or at a specified time in the future), and causes the identified app(s) to be executed, including providing the apps with any relevant configuration data 156. As described in more detail, the execution of an app can broadly include using computing resources provided by one or more services of a cloud provider network to execute the app (e.g., by invoking execution of application code using a managed compute service such as an on-demand code execution service, container service, etc.).

In FIG. 1, the circles labeled "1"-"4" are shown to illustrate an example process involving an actions service 100 receiving an receive API request to perform an action (e.g., to obtain data from external services, cause devices to perform actions, etc.), optionally obtaining configuration data to be used to execute the action, and further causing application code implementing the actions to be executed responsive to the requests. At circle "1," the actions service 100 receives, from an application associated with a data intake and query system 122, an API request to execute an action involving a service or device that is external to the actions service. As indicated, the action can broadly include any action involving a service or device that is external to the actions service 100, including any type of external service 116 or any type of computing resource 150 located in an external tenant network 110. The actions service 100 can receive API requests generally from any other application or service such as, for example, an IT and security operations application 104, a security intelligence management service 118, an enterprise security service 120, a data intake and query system 122, and the like.

Depending on the context of the requesting application, the types of action requests received by the actions service 100 can include requests to, e.g., obtain threat or reputation scores for particular URLs or IP addresses from an external security analytics service, causing network devices to block certain IP addresses, open tickets in a ticketing system, update user or resource permission configurations at an identity and access management service, obtain investigative information about user credentials, obtain enrichment information or configuration data related to a computing asset from an asset management platform, obtain search results from a search engine, send Short Message Service (SMS) or Multimedia Message Service (MMS) messages using an external messaging service, execute playbooks at an IT and security operations application, send email using a Simple Mail Transfer Protocol (SMTP) service, obtain network information using an network mapper (NMAP) service, obtain Domain Name System (DNS) records from a DNS service, translate text from one language to another using a language translation service, among many other possible types of actions.

Figure 2:
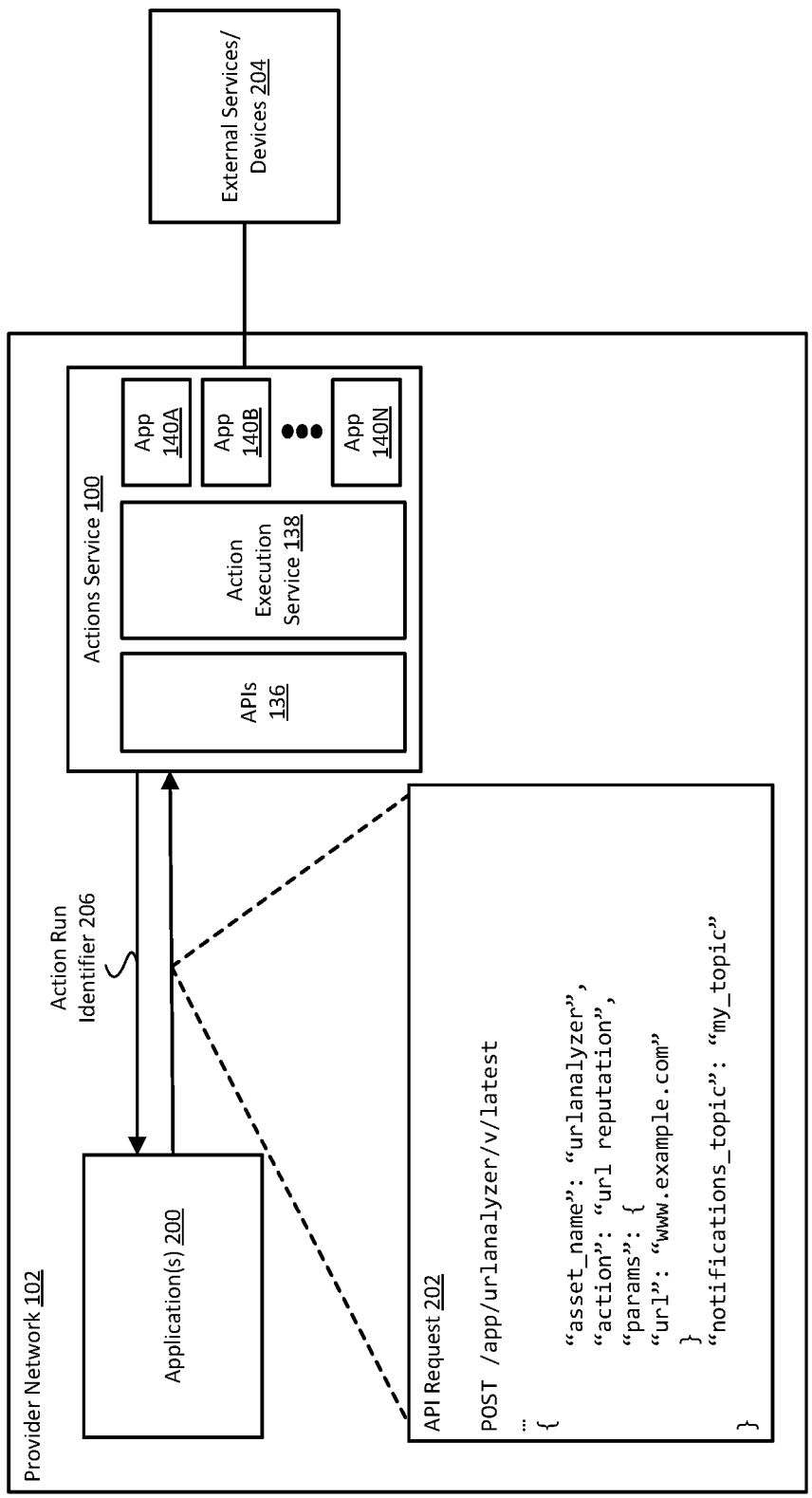
FIG. 2 is a block diagram illustrating an example API request processed by an actions service using managed application code according to some examples.

FIG. 2 is a block diagram illustrating an example API request processed by an actions service 100 using application code managed by the actions service according to some examples. In the example shown in FIG. 2, an application 200 sends an API request 202 to the actions service 100 to perform an action. As indicated in relation to FIG. 1, the application 200 can broadly include any type of IT operations application, security application, or other type of application with access and permissions to request the performance of actions by the actions service 100, where the action involves the actions service 100 interacting in some manner with some external service or device 204.

The API request 202 shown in FIG. 2 illustrates an example format for a request sent by an application 200 to the actions service 100 to request performance of an action supported by the service. As shown, the request 202 can include a URL identifying an app (e.g., a "urlanalyzer" app used to interface with a URL analysis service) and, optionally, further identifying a version of the app to be used to execute the action (e.g., "latest"). In some examples, the actions service 100 can simultaneously support multiple versions of a same app, e.g., to help ensure that updates to an app do not cause issues with applications using an existing version of an app, thereby enabling the applications to upgrade to a newer version of an app when desired.

Although the example shown in FIG. 2 illustrates a request identifying a particular app (e.g., the "urlanalyzer" app), in other examples, a request can more generically request execution of an action without specifying a particular app to be used to execute the action. For example, the actions service 100 can optionally allow requests to specify a generic action (e.g., a "block IP" action) and the actions service 100 can automatically identify one or more suitable apps from apps 140A-140N to perform the action (e.g., based on data managed by the actions service 100 mapping actions to one or more apps that include implementations of the action). In some examples, the selection of a suitable app by the actions service 100 can depend in part on a type of computing asset identified in the request (e.g., a type of firewall in the case of a "block IP" action) or based on other information associated with the request (e.g., based on particular apps configured in association with an account or tenant generating the request).

In some examples, the request 202 can further include data (e.g., JavaScript® Object Notation (JSON®) formatted data in the body of the request, or data in any other format) specifying additional request parameters used by the APIs 136 to interpret the request and by the action execution service 138 to execute the request. These parameters can include, but are not limited to, an identifier of an asset related to the requested action (e.g., where an asset represents a configuration of an app used to interface with a particular service or device), an identifier of an action or actions to be performed (e.g., obtaining a URL reputation score from the URL analyzer service in the example of FIG. 2), and any additional parameters to the action (e.g., a URL in the example of the URL reputation action in FIG. 2). In some examples, a request 202 can further include an identifier of a pub/sub notifications topic, message queue, or other type of resource to be used by the actions service 100 to provide results information obtained based on execution of the requested action. In the example of FIG. 2, the request 202 includes an identifier of a topic name "my_topic" to be used by the actions service 100 to provide incremental status updates and results information based on execution of the requested URL reputation action.

As indicated, in some examples, the actions service 100 can provide a common action for different services or devices of the same type. For example, two or more different apps for different types of firewalls might each implement a "block IP" action. In this example, if an application (e.g., an IT and security operations application 104) is configured to interface with both types of firewalls, the application can optionally request the actions service 100 to perform the block IP action on specific assets (e.g., on only one or more firewalls of a particular type) or on any assets associated with a matching app that supports that action (e.g., the block IP action can be requested for execution against two or more types of firewalls with matching apps supporting the block IP action). For example, if a user using an IT and security operations application 104 has configured the application to interact with computing devices in a tenant network 110 containing multiple different types of firewalls, each accessible via a respective app from apps 140A-140N, the user can cause the IT and security operations application 104 to request, via the actions service 100, a block IP action to be performed against one or more particular types of firewalls present in the tenant network 110, or can issue a single block IP action request to be performed against any type of firewall in the tenant network 110. As another example, a request to update a password associated with an account can involve the actions service updating the password at multiple different types of services or devices using multiple different apps from apps 140A-140N.

In some examples, the execution of an action can involve the actions service 100 orchestrating execution of multiple apps and aggregating a response to be returned to a requesting application. As an example, the actions service 100 can include an action used to obtain a reputation score for a URL. The actions service 100 might include two or more apps 140A-140N used to integrate with two or more different services that can be used to obtain various types of reputation scores or other information for a URL. In this example, the actions service 100 can cause each of these apps to obtain information for a URL, aggregate the responses obtained from the external services (e.g., by averaging, summing, or performing other processing on the obtained results), and returning a response to the requesting application based on the aggregation. Other similar types of app aggregations can be performed, e.g., to obtain risk scores for file hashes, security analytics data for computing assets, and the like.

In some examples, it is noted that the ability to request the actions service 100 to perform actions against particular types of external services and devices can involve configuring the actions service 100 to access those services or devices. For example, if a user desires to use an IT and security operations application 104 to obtain information from one or more external services 116, or to interact with one or more computing resources 150 in a tenant network 110, the user can provide configuration data to the IT and security operations application 104 or the actions service 100 to enable the corresponding apps perform such integrations. As indicated, this configuration information can include, e.g., account information, API keys, etc., that enable the apps to authenticate with or otherwise send requests that can be processed by the corresponding services and devices. In some examples, users can provide such configuration data by providing the information via a GUI or other interface provided by a relevant application or actions service 100 before requesting actions involving the services or devices. In other examples, a requesting application or the actions service 100 can prompt users or applications to provide relevant configuration data 156 upon receiving requests to perform actions for which the actions service 100 does not yet possess configuration data that can be used to perform the actions. In some examples, some configuration data used to interface with computing resources 150 located in a tenant network 110 can be stored in a password vault 158 in the tenant network and accessed remotely by apps 152 running in those networks.

The actions service 100 can optionally include any number of APIs in addition to an API used to request the execution of an action. An as an example, the actions service 100 can include APIs to obtain a list of available apps or actions. In some examples, an API request to obtain a list of available apps or actions can be filtered based on a particular type of app or action of interest (e.g., a client or application can request a list of apps or actions associated with a particular type of service or computing asset, with a specific service or computing asset manufacturer, etc.). The actions service 100 can further include APIs used to obtain a list of configured assets (e.g., a list of assets configured in association with a particular user or tenant of the service or data intake and query system 122), to obtain configuration details for a particular asset, to update the configuration details associated with a particular asset, to obtain status information for an action run, etc.

In some examples, responsive to receiving an API request 202, the actions service 100 generates an action run identifier 206 and sends a response to the requesting application including the action run identifier. The action run identifier is used by the actions service 100 and the requesting application to identify an instance of a requested action or actions execution. An application 200 can use an action run identifier 206 to request and obtain status information for a requested action execution, e.g., by sending a separate API request to the actions service 100 for the status information (e.g., where the status information can include indicators such as "pending," "in progress," "completed," "failed," etc., optionally with additional details). The action run identifier 206 can also be used, in some examples, to identify results data generated by an app and optionally stored in a separate storage service, among other possible uses.

Returning to FIG. 1, at circle "2," the actions service further processes the request to cause execution of an action identified by the request received via APIs 136. In some examples, these processes can include identifying application code that, upon execution, implements the requested action (e.g., by identifying an app from apps 140A-140N that includes an implementation of the requested action), identifying configuration data 156 for the service or device associated with the action (e.g., to obtain or identify account information, API keys, etc., to be used by a corresponding app), scheduling execution of the action (e.g., either immediately or at a future point in time or interval), and so forth. At circle "3," the actions service 100 causes execution, using computing resources provided by the cloud provider network 102, of the identified application code to perform the action, where causing execution of the application code can include providing any identified configuration data as input to the action.

Figure 3:
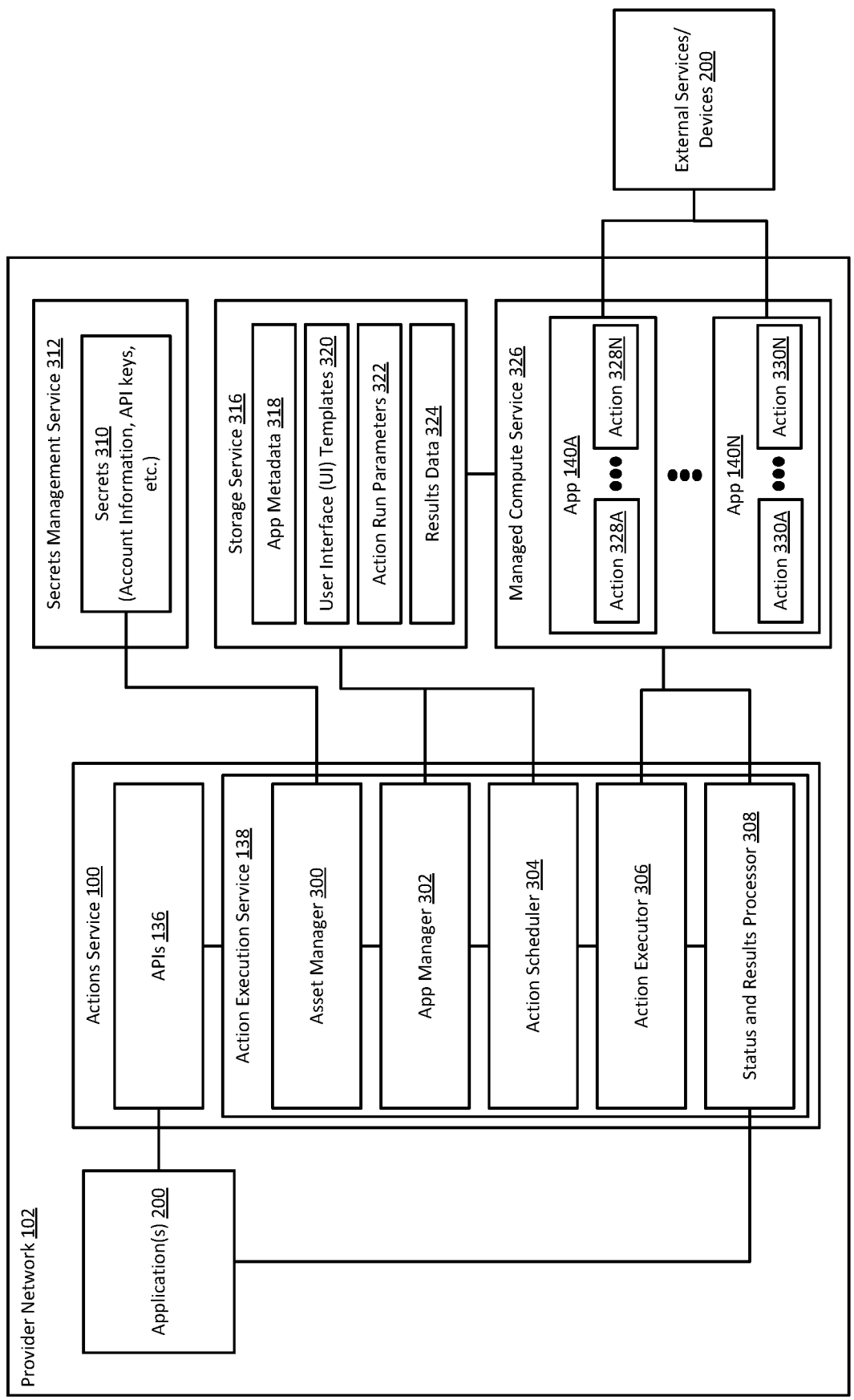
FIG. 3 is a block diagram illustrating additional details of a cloud-based actions service used to execute actions responsive to API requests from various applications associated with a data intake and query system according to some examples.

FIG. 3 is a block diagram illustrating additional details of a cloud-based actions service 100 used to execute actions responsive to API requests from various applications associated with a data intake and query system 122 according to some examples. In FIG. 3, the actions service 100 includes APIs 136 and the action execution service 138, as illustrated in FIG. 1. As shown, the action execution service 138 can further include an asset manager 300, an app manager 302, an action scheduler 304, an action executor 306, and a status and results processor 308. The components of the actions service 100 shown in FIG. 3 are provided for illustrative purposes; in other examples, an actions service 100 can include a different set of components used to schedule and execute requested actions.

As indicated, responsive to receiving an API request to execute an action, application logic implementing the APIs 136 interprets the request and can provide an action run identifier to the requesting application. The action run identifier is used to identify an instance of the actions service 100 executing an action and can be used by a requesting application to obtain status or results information from the actions service 100.

In some examples, the asset manager 300 manages and obtains configuration data used by apps 140A-140N to communicate with and to implement actions involving third party services or devices 204. For example, the types of configuration data used by the actions service 100 can include, but is not limited to, IP addresses of URLs used to access a device or service, API keys, account information including usernames, passwords, etc. In some examples, the asset manager 300 can store and manage secrets 310 included in the configuration data (e.g., sensitive account information, API keys, etc.) using a secrets management service 312 or other service provided by the provider network 102. A secrets management service 312, for example, enables users and applications to easily store, rotate, manage, and retrieve various types of credentials, API keys, and other secrets throughout their lifecycle. Responsive to a request received by the actions service 100 to execute an action, in some examples, the asset manager 300 can thus be used to obtain particular configuration data relevant to the requested action and to a user or tenant associated with the request (e.g., where each user or tenant of the actions service 100 or data intake and query system 122 can have a different set of configured assets that are stored and managed separately) and to provide the configuration data to other components of the action execution service 138.

In some examples, an app manager 302 manages available apps and corresponding assets. For example, the app manager 302 can manage configuration data used to map particular versions of apps to the corresponding application code used to implement the app, where the application code can be stored at one or more storage services 316 or managed compute service 326. In some examples, the management of apps provided by an actions service 100 can further include management of associated app metadata 318 (e.g., including descriptions of what each app does, available actions, app version information, deployment options, etc.) and user interface (UI) templates 320 (e.g., including HTML or other types of templates that can be used by the actions service 100 to generate files that can be rendered for display and including information obtained via a corresponding app). In this manner, responsive to requests to execute particular actions, the app manager 302 can be used by the action execution service 138 to identify one or more appropriate apps to execute the action, to obtain metadata used to deploy and execute the app, and optionally to obtain UI templates used to generate UIs to display results data.

In some examples, the action scheduler 304 accepts incoming action execution requests (e.g., based on requests received via APIs 136) and schedules action runs either immediately, at defined time in the future, or can schedule multiple executions of an action at specified intervals in the future. The timing of an action execution can be specified in an incoming request or can be based on a type of action requested (e.g., some actions might execute at a specified point in time in the future or at specified intervals by default). In examples where execution of an action is requested at a specified time in the future or at specified intervals, the action scheduler 304 tracks upcoming actions and their due times to ensure that execution of the actions is initiated at the requested time or time intervals.

Upon determining to run an action, in some examples, the action scheduler 304 sends an "execute" message to a shared message queue or otherwise invokes execution of the corresponding application code identified by the app manager 302 and using computing resources provided by a managed compute service 326. For example, the actions service 100 can provision one or more message queues using a message queuing service provided by the cloud provider network 102, where these queues can be used to schedule action executions, to exchange status and results information among apps and the action service 100, and the like. In some examples, an action scheduler 304 can further store action run parameters 322 (e.g., some or all of which may be obtained from parameters included in an initial API request), JSON metadata (e.g., including configuration data obtained by the asset manager 300, app manager 302, or both), or any other information to be used by an app to execute an action, where the action run parameters 322 can be stored using a storage service 316 (e.g., using a logical storage container provided by an object storage service, or using any other type of storage resource accessible to an app).

In some examples, the action executor 306 causes the app or apps identified for the requested action to be executed responsive to a request from the action scheduler 304, as described above. The action executor 306 can cause execution of application code (shown in FIG. 3 as app 140A implementing actions 328A-328N, . . . , app 140N implementing actions 330A-330N) using a managed compute service 326 provided by the provider network 102. The managed compute service 326 can include, for example, an on-demand code execution service (or "serverless" code execution service), a container service, a virtual machine (VM) service, or any other type of computing service that can be used to execute an app. As an example, if an app from apps 140A-140N is stored as Python code, the action executor 306 can invoke execution of the app code using an on-demand code execution service by sending a message to a corresponding message queue used to invoke the code; if an app is stored as a container, the action executor 306 can launch the container using a container service, etc.

In some examples, the execution of an app can involve storing results data 324 obtained or generated by the app using a storage resource provided by a storage service 316. For example, if the results data 324 includes one or more large files or other data that cannot be provided using a message queue or other direct response format due to size limits, an app can store the results data 324 at a storage service 316 and provide a path or other identifier that can be used by a requesting application to obtain the results data. The path or other identifier of a storage location of the results data 324 can be provided in a message sent to a message queue monitored by a status and results processor 308, where the status and results processor 308 can forward the information to a queue used to provide updates to a requesting application.

In some examples, the execution of an app can include the invocation of multiple separate functions by an on-demand code execution service. In this example, each of the functions can be configured to invoke execution of a subsequent function by, e.g., sending a message to a message queue used to invoke a subsequent function, storing data in a particular logical storage container used to invoke a subsequent function, or using any other mechanism to "chain" execution of the multiple functions. In these examples, the functions can use a common storage resource provided by a storage service 316 to operate on data across multiple function executions (e.g., where one function might obtain data from an external security analytics service, while a subsequent function is invoked to process or filter the data obtained from the service before returning the data to a requesting application, etc.).

In some examples, the status and results processor 308 obtains and provides to requesting applications status and results information for requested action executions. For example, the status and results processor 308 can subscribe to a message queue that one or more apps 140A-140N use to provide run time progress updates and debug messages. The status and results processor 308 can then forward these messages to the original requestor using a default message queue or using a message queue identified by the requesting application in the original action execution request. Once the action execution is complete, the status and results processor 308 provides an indication that the action execution is complete by sending a message to a corresponding message queue or by otherwise sending a notification to the requesting application.

Returning to FIG. 1, the execution of some actions involves interacting with an external device in a tenant network 110 (e.g., to change a configuration at a firewall, to update computing resource information, etc.). In these examples and others, the actions service 100 can interface with an intermediary secure tunnel service 160 to send communications to, and to receive communications from, an on-premises action execution agent 148 running in a tenant network 110. In some examples, the secure tunnel service 160 operates as a service that establishes WebSocket or other types of secure connections to endpoint devices. As one example, the secure tunnel service 160 can establish a first secure connection to the actions service 100 and a second secure connection to an on-premises proxy 146 and an on-premises action execution agent 148 executing in a tenant network 110, where each connection is established using a handshake technique with the respective endpoints. Once established, the connection enables two-way communications between the actions service 100 (or, more specifically, with apps of the actions service 100) and the on-premises action execution agent 148 without the need to open a port in a firewall or perform other configurations to a network associated with the tenant network 110. In some examples, the secure tunnel service 160 is a cloud-based service (e.g., executing using computing resources provided by a provider network 102) configured to transfer data between an actions service 100 and computing devices located on networks external to the provider network 102, including on-premises action execution agents, mobile devices, and the like. In other examples, the secure tunnel service 160 executes using computing resources located outside of a cloud-based environment.

In some examples, the secure tunnel service 160 performs authentication operations with other components (e.g., the actions service 100 and an on-premises proxy 146 or on-premises action execution agent 148) to establish trust and then establishes secure communications channels with those components, where the secure tunnel service 160 and other components transmit secure communications using the secure communications channels. In some examples, the secure tunnel service 160 provides end-to-end encryption (E2EE) of communications between the actions service 100 and an on-premises action execution agent 148 via an on-premises proxy 146 by transmitting one or more encrypted data packets between the actions service and the on-premises proxy. In some examples, communications sent through the secure tunnel service 160 are in the form of data packets, where each data packet includes, for example, a payload and a device identifier for a destination device that is to receive the data packet. In other examples, the data packet can also include a device identifier for the source device or an instance identifier that indicates an application instance associated with the data packet. In some examples, the data packet is encrypted prior to being transmitted to the secure tunnel service 160, e.g., using a public key of an asymmetric key pair generated by a receiving device. While in some examples, the secure tunnel service 160 decrypts the data packet before sending the data packet to its intended destination, in other examples, the secure tunnel service 160 forwards the encrypted data packet to its intended destination without performing a decryption process.

In some examples, the actions service 100 and on-premises proxy 146 communicate with the secure tunnel service 160 across intermediate network(s), which can include communications networks such as a local area network (LAN), wide area network (WAN), cellular network (e.g., LTE, HSPA, 3G, 4G, and/or any other network based on cellular technologies), and/or networks using any of wired, wireless, terrestrial microwave, or satellite links. In some examples, after an on-premises action execution agent 148 is installed and executed within a tenant network 110, the on-premises action execution agent 148 uses an on-premises proxy 146 to initiate a process to establish a secure connection (e.g., a gRPC Remote Procedure Calls (gRPC) over HTTP/2 connection) with a secure tunnel service 160. For example, the secure tunnel service 160 may establish the secure connection and associate the secure connection with a device identifier for the on-premises proxy 146.

In some examples, the secure tunnel service 160 maintains a database that stores document data structures and optionally stores keys. This database, for example, can be a structure query language (SQL) database, or a NoSQL database, such as an AMAZON® DynamoDB. The database can include, e.g., a key store that stores encryption keys, including single-use session keys and long-term keys associated with devices that send E2EE communications. In other examples, the secure tunnel service 160 does not store encryption keys and routes messages without the use of a key store. In some examples, the database also includes a routing table that includes address information associated with devices registered with the secure tunnel service 160 with which the service has established secure communications. The secure tunnel service 160, for example, can send queries to the database to determine, based on a device identifier in a particular data packet, the address of the intended recipient of the particular data packet.

As illustrated in FIG. 1, the secure tunnel service 160 may not directly communicate with an on-premises action execution agent 148 but communicate instead through an on-premises proxy 146. As indicated herein, the on-premises proxy 146 is a process executing in the tenant network 110 and that operates as a gateway between the secure tunnel service 160 and the actions service 100. The on-premises proxy 146 is configured to receive messages from the secure tunnel service 160 and to forward the messages to the on-premises action execution agent 148 for processing. The on-premises proxy 146 can also be configured to generate and send messages (e.g., notifications, alerts, etc.) actions service 100 via the secure tunnel service 160. In some examples, the on-premises proxy 146 can also send messages to configured mobile devices in accordance with a push notification service, such as the APPLE® Push Notification service (APN), or GOOGLE® Cloud Messaging (GCM). In some examples, the on-premises proxy 146 is configured to perform the management, generation, and registration of encryption keys used to communicate with the secure tunnel service 160.

Figure 4:
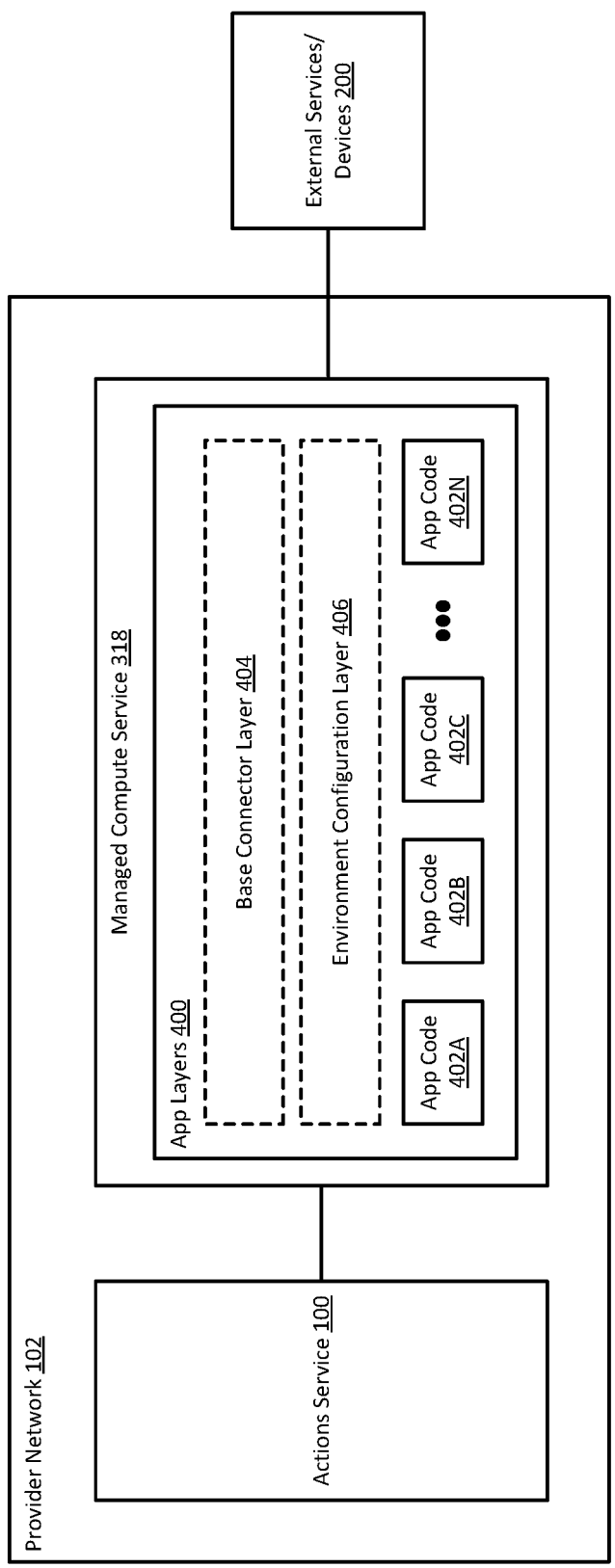
FIG. 4 is a block diagram illustrating an example architecture of apps managed by an actions service and including application code that, upon execution, perform various actions supported by the actions service according to some examples.

FIG. 4 is a block diagram illustrating an example architecture of apps managed by an actions service and including application code that, upon execution, performs various actions supported by the actions service according to some examples. In FIG. 4, a collection of app layers 400 are shown in association with app code 402A-402N. In some examples, an app layer is file or resource that packages libraries or other dependencies that can be used by other layers and application code. For example, a layer can include libraries, custom runtimes, data, configuration files, or other data that may be used across two or more dependent functions. For example, if multiple apps associated with an actions service use one or more common libraries, configuration files, etc., these common elements can be provided to a managed compute service as one or more layers to promote code sharing, separation of responsibilities, among other benefits.

In the example of FIG. 4, a first example base connector layer 404 can include core libraries and other data used by some or all apps 402A-402N. As another example, a second environment configuration layer 406 can include additional code, configurations, etc., used to initialize environment variables for individual tenants of the actions service 100, provide other shared dependencies, etc. In some examples, the app code 402A-402N including the application code used to interface with particular external services or devices and can use dependences inheriting from one or more base layers.

Returning to FIG. 1, at circle "4," an app executed to perform a requested action interfaces with an external service or device to perform the action. As indicated, an app can use an API (e.g., API 142 or API 144) to request data from an external service, request a service to perform an action, use another type of interface to interact with external devices, and the like, based on the implementation provided by the app. Although many of the examples described herein involve interactions with services and devices external to the cloud provider network 102, in some examples, an app can be implemented to interact with one or more other services of the application environment, with another application associated with the data intake and query system 122 (e.g., an app can be used to integrate an IT and security operations application 104 with a security intelligence management service 118), or with computing resources hosted within the provider network 102.

As indicated, in some examples, once an app completes execution of an action, the app can optionally store data associated with the action in a storage resource, send a message to a message queue indicating that the action execution is complete (and optionally including results data in the message, or including an identifier of a storage location of the results data), or otherwise indicating to a requesting application that the action is complete. If execution of the action fails for some reason, an app can similarly provide an indication of the failure and optionally provide debug information. In some examples, the results data can include GUI-related result files (e.g., generated HTML files) to be used by a downstream application to display results information. The GUI files, for example, can be based on one or more obtained UI templates for the app, as described above.

In some examples, the actions service 100 can cache the results data from an action execution and optionally use the cached result data to respond to requests specifying a same action and action parameters. For example, a first request received by the actions service 100 might request execution of an action used to obtain a reputation score for a URL using an external security analytics service and, based on execution of the action, the service can store data indicating the reputation score and the action parameters specified in the request. In this example, if a second request is received specifying the same action and the same parameters (e.g., the same URL), the actions service 100 can optionally respond with the results data obtained from the results data cache. It is noted that the second request can originate from a same application that generated the first request or, in other examples, the actions service 100 can use cached results data to respond to similar requests received from two or more different applications or services (e.g., each of two different applications might request a URL reputation score for a same URL near in time to one another).

In some examples, the actions service 100 can store cached results data for different actions for varying durations of time depending on the nature of the corresponding results data. For example, the results data for some types of actions (e.g., whois lookups, URL reputation scores, file hash analyses, etc.) might not change frequently and thus the service 100 can be configured to store and use cached data for such actions for possibly hours, days, etc. Other types of actions might be associated with results data that changes more frequently and thus is cached by the service for only shorter durations of time. Other types of actions (e.g., operational actions such as adding or removing users, updating credentials, etc.) may not be associated with results data that can be cached at all. In some examples, the actions service 100 can optionally allow individual apps to specify in corresponding app configuration data whether results data can be cached and, if so, for how long results data can be cached for particular actions supported by an app.

In some examples, the actions service 100 enables users to upload apps including custom application code used to integrate the actions service 100 with external services or devices that may not be currently supported by the service. For example, a user can create application code (possibly conforming to an app template defined by the actions service 100) that defines one or more actions supported by an API of an external service that the actions service currently does not integrate with. Upon receiving a request to add the custom application code to the actions service 100, the service can store the application code alongside apps 140A-140N (possibly in a storage area that is accessible to only a tenant of the actions service 100 generating the request). A user or application can then request the actions service 100 to perform actions defined by the custom application code to interface with the new external service or device in a manner similar to the processes for requesting actions described elsewhere herein.

Figure 5:
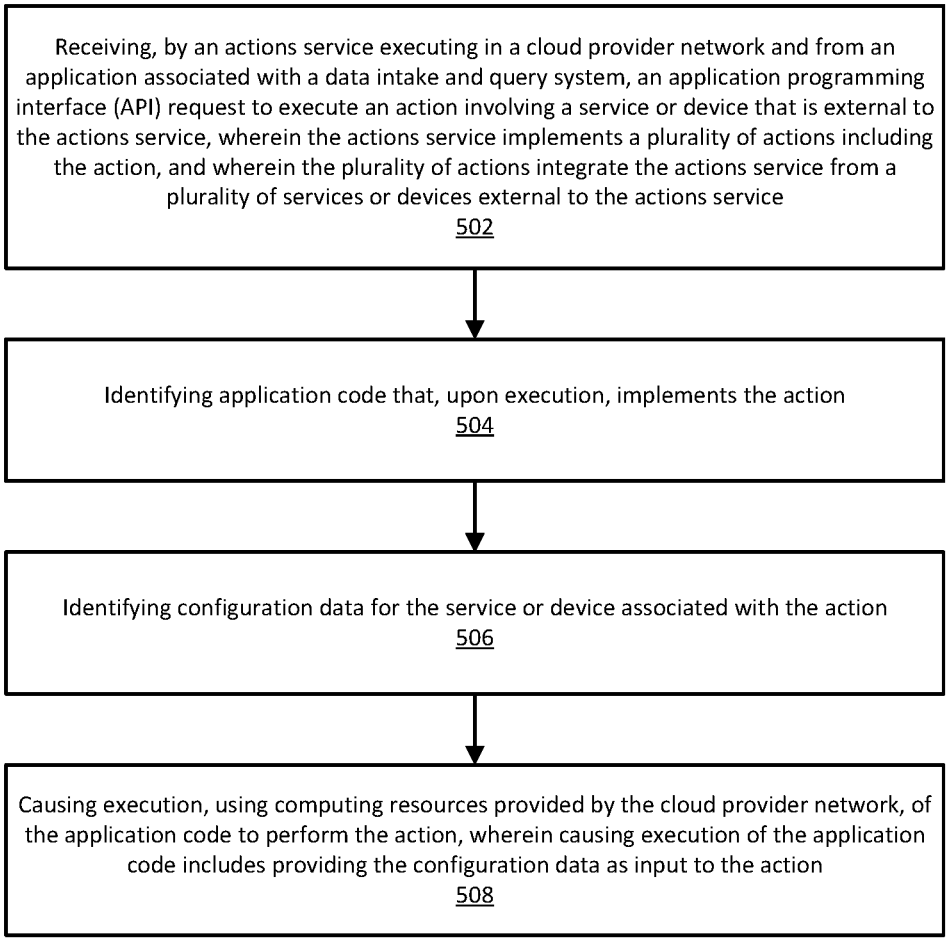
FIG. 5 is a flow diagram illustrating operations of a method for processing a request received by an actions service to perform an action involving a service or device that is external to the actions service according to some examples.

FIG. 5 is a flowchart illustrating an example process 500 for processing a request received by an actions service to perform an action involving a service or device that is external to the actions service according to some examples. The example process 500 can be implemented, for example, by a computing device that comprises a processor and a non-transitory computer-readable medium. The non-transitory computer readable medium can be storing instructions that, when executed by the processor, can cause the processor to perform the operations of the illustrated process 500. Alternatively or additionally, the process 500 can be implemented using a non-transitory computer-readable medium storing instructions that, when executed by one or more processors, case the one or more processors to perform the operations of the process 500 of FIG. 5.

The process 500 includes, at block 502, identifying, by a security intelligence management service running in a cloud provider network, a data source external to the cloud provider network and from which data is to be obtained by the security intelligence management service, wherein the data relates to a potential incident identified by an application associated with the security intelligence management service, and wherein the potential incident affects the security or operation of a computing environment.

The process 500 further includes, at block 504, causing execution of a first function using an on-demand code execution service of the cloud provider network, wherein the first function obtains the data from the data source.

The process 500 further includes, at block 506, causing execution of a second function using the on-demand code execution service, wherein the second function performs at least one operation on the data obtained from the data source to obtain processed data.

The process 500 further includes, at block 508, providing the processed data to the application associated with the security intelligence management service.

In some examples, the API request is a first API request, the service or device is a first service or device, the action is a first action, the application code is first application code, and the process further includes: receiving, by the actions service, a second API request to execute a second action involving a second service or device; identifying second application code that, upon execution, implements the second action, wherein the second application code is separate from the first application code; and causing execution, using computing resources provided by the cloud provider network, of the second application to perform the second action.

In some examples, the operations further include sending an action run identifier to the application associated with the data intake and query system; receiving, from the application associated with the data intake and query system, a request for status information related to execution of the action, wherein the request includes the action run identifier; and sending a response indicating a status of execution of the action.

In some examples, causing execution of the application code to perform the action includes sending a message to a message queue, wherein the message causes an on-demand code execution service to invoke execution of the application code.

In some examples, the operations further include obtaining, from the service or device that is external to the actions service, results data; storing the results data in a logical storage container; and sending an identifier of the logical storage container to the application associated with the data intake and query system.

In some examples, execution of the application code includes sending, to a message queue, a message indicating that the action has completed execution, and the actions service provides an indication to the application associated with the data intake and query system that the action has completed execution based on the message.

In some examples, the request specifies a version of the application code to be used to perform the action, and wherein the actions service identifies the application code based in part on the version specified in the request.

In some examples, the operations further include receiving a request including the configuration data to be used by the actions service to access the service or device that is external the actions service, wherein the request is associated with a tenant of the actions service; and storing the configuration data using a storage resource accessible to the actions service.

In some examples, the operations further include determining that configuration data for the service or device associated with the action does not exist; prompting a user to provide the configuration data to be used by the actions service to access the service or device; receiving a request including the configuration data to be used by the actions service to access the service or device that is external the actions service, wherein the request is associated with a tenant of the data intake and query system; and storing the configuration data using a storage resource accessible to the actions service.

In some examples, the service or device is a first service or device, the API request is a first API request, the action is a first action, and the operations further include: receiving a request identifying custom application code implementing an action involving a second service or device; storing the custom application code; receiving a second API request to execute an action involving the second service or device; causing execution of the custom application code to perform the second action.

In some examples, the API request is a first API request, wherein the first API request includes one or more first action parameters to be used by the application code to perform the action, wherein execution of the application code to perform the action generates results data, and the operations further include: storing the results data at a storage resource, wherein the results data is stored in association with the one or more first action parameters; receiving a second API request to execute the action, wherein the second API request includes the one or more second action parameters; determining that the one or more second action parameters are the same as the one or more first action parameters; and sending a response identifying a storage location of the results data.

In some examples, the operations further include receiving, from the application associated with the data intake and query system, a request to obtain a list of actions supported by the actions service; and sending a response including the list of actions supported by the actions service.

Entities of various types, such as companies, educational institutions, medical facilities, governmental departments, and private individuals, among other examples, operate computing environments for various purposes. Computing environments, which can also be referred to as information technology environments, can include inter-networked, physical hardware devices, the software executing on the hardware devices, and the users of the hardware and software. As an example, an entity such as a school can operate a Local Area Network (LAN) that includes desktop computers, laptop computers, smart phones, and tablets connected to a physical and wireless network, where users correspond to teachers and students. In this example, the physical devices may be in buildings or a campus that is controlled by the school. As another example, an entity such as a business can operate a Wide Area Network (WAN) that includes physical devices in multiple geographic locations where the offices of the business are located. In this example, the different offices can be inter-networked using a combination of public networks such as the Internet and private networks. As another example, an entity can operate a data center: a centralized location where computing resources are kept and maintained, and whose resources are accessible over a network. In this example, users associated with the entity that operates the data center can access the computing resources in the data center over public and/or private networks that may not be operated and controlled by the same entity. Alternatively or additionally, the operator of the data center may provide the computing resources to users associated with other entities, for example on a subscription basis. In both examples, users may expect resources to be available on demand and without direct active management by the user, a resource delivery model often referred to as cloud computing.

Entities that operate computing environments need information about their computing environments. For example, an entity may need to know the operating status of the various computing resources in the entity's computing environment, so that the entity can administer the environment, including performing configuration and maintenance, performing repairs or replacements, provisioning additional resources, removing unused resources, or addressing issues that may arise during operation of the computing environment, among other examples. As another example, an entity can use information about a computing environment to identify and remediate security issues that may endanger the data, users, and/or equipment in the computing environment. As another example, an entity may be operating a computing environment for some purpose (e.g., to run an online store, to operate a bank, to manage a municipal railway, etc.) and information about the computing environment can aid the entity in understanding whether the computing environment is serving its purpose well.

A data intake and query system can ingest and store data obtained from the components in a computing environment, and can enable an entity to search, analyze, and visualize the data. Through these and other capabilities, the data intake and query system can enable an entity to use the data for administration of the computing environment, to detect security issues, to understand how the computing environment is performing or being used, and/or to perform other analytics.

Figure 6:
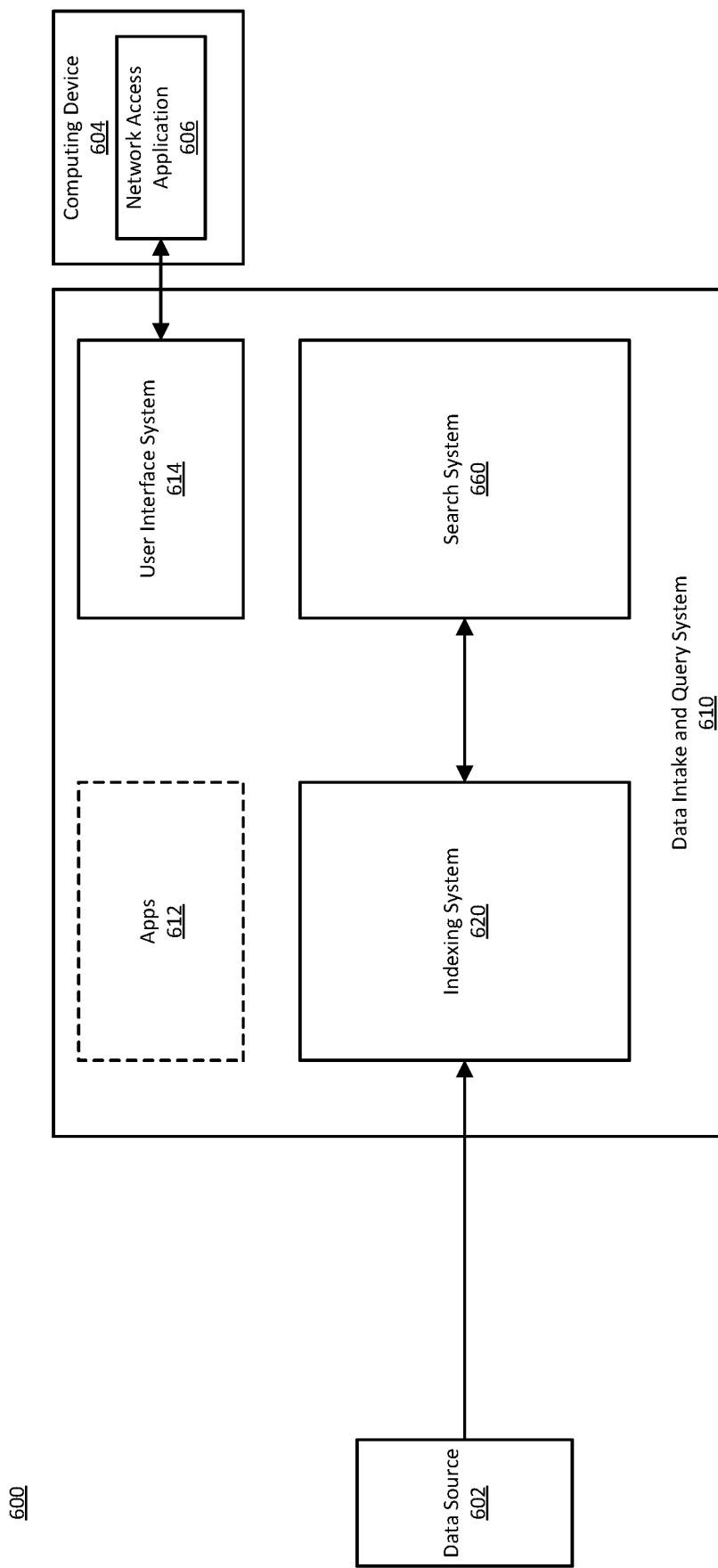
FIG. 6 is a block diagram illustrating an example computing environment that includes a data intake and query system according to some examples.

FIG. 6 is a block diagram illustrating an example computing environment 600 that includes a data intake and query system 610. The data intake and query system 610 obtains data from a data source 602 in the computing environment 600 and ingests the data using an indexing system 620. A search system 660 of the data intake and query system 610 enables users to navigate the indexed data. Though drawn with separate boxes, in some implementations the indexing system 620 and the search system 660 can have overlapping components. A computing device 604, running a network access application 606, can communicate with the data intake and query system 610 through a user interface system 614 of the data intake and query system 610. Using the computing device 604, a user can perform various operations with respect to the data intake and query system 610, such as administration of the data intake and query system 610, management and generation of "knowledge objects," initiating of searches, and generation of reports, among other operations. The data intake and query system 610 can further optionally include apps 612 that extend the search, analytics, and/or visualization capabilities of the data intake and query system 610.

The data intake and query system 610 can be implemented using program code that can be executed using a computing device. A computing device is an electronic device that has a memory for storing program code instructions and a hardware processor for executing the instructions. The computing device can further include other physical components, such as a network interface or components for input and output. The program code for the data intake and query system 610 can be stored on a non-transitory computer-readable medium, such as a magnetic or optical storage disk or a flash or solid-state memory, from which the program code can be loaded into the memory of the computing device for execution. "Non-transitory" means that the computer-readable medium can retain the program code while not under power, as opposed to volatile or "transitory" memory or media that requires power in order to retain data.

In various examples, the program code for the data intake and query system 610 can execute on a single computing device, or may be distributed over multiple computing devices. For example, the program code can include instructions for executing both indexing and search components (which may be part of the indexing system 620 and/or the search system 660, respectively), and can be executed on a computing device that also provides the data source 602. As another example, the program code can execute on one computing device, where the program code executes both indexing and search components, while another copy of the program code executes on a second computing device that provides the data source 602. As another example, the program code can execute only an indexing component or only a search component. In this example, a first instance of the program code that is executing the indexing component and a second instance of the program code that is executing the search component can be executing on the same computing device or on different computing devices.

The data source 602 of the computing environment 600 is a component of a computing device that produces machine data. The component can be a hardware component (e.g., a microprocessor or a network adapter, among other examples) or a software component (e.g., a part of the operating system or an application, among other examples). The component can be a virtual component, such as a virtual machine, a virtual machine monitor (also referred to as a hypervisor), a container, or a container orchestrator, among other examples. Examples of computing devices that can provide the data source 602 include personal computers (e.g., laptops, desktop computers, etc.), handheld devices (e.g., smart phones, tablet computers, etc.), servers (e.g., network servers, compute servers, storage servers, domain name servers, web servers, etc.), network infrastructure devices (e.g., routers, switches, firewalls, etc.), and "Internet of Things" devices (e.g., vehicles, home appliances, factory equipment, etc.), among other examples. Machine data is electronically generated data that is output by the component of the computing device and reflects activity of the component. Such activity can include, for example, operation status, actions performed, performance metrics, communications with other components, or communications with users, among other examples. The component can produce machine data in an automated fashion (e.g., through the ordinary course of being powered on and/or executing) and/or as a result of user interaction with the computing device (e.g., through the user's use of input/output devices or applications). The machine data can be structured, semi-structured, and/or unstructured. The machine data may be referred to as raw machine data when the data is unaltered from the format in which the data was output by the component of the computing device. Examples of machine data include operating system logs, web server logs, live application logs, network feeds, metrics, change monitoring, message queues, and archive files, among other examples.

As discussed in greater detail below, the indexing system 620 obtains machine date from the data source 602 and processes and stores the data. Processing and storing of data may be referred to as "ingestion" of the data. Processing of the data can include parsing the data to identify individual events, where an event is a discrete portion of machine data that can be associated with a timestamp. Processing of the data can further include generating an index of the events, where the index is a data storage structure in which the events are stored. The indexing system 620 does not require prior knowledge of the structure of incoming data (e.g., the indexing system 620 does not need to be provided with a schema describing the data). Additionally, the indexing system 620 retains a copy of the data as it was received by the indexing system 620 such that the original data is always available for searching (e.g., no data is discarded, though, in some examples, the indexing system 620 can be configured to do so).

The search system 660 searches the data stored by the indexing system 620. As discussed in greater detail below, the search system 660 enables users associated with the computing environment 600 (and possibly also other users) to navigate the data, generate reports, and visualize results in "dashboards" output using a graphical interface. Using the facilities of the search system 660, users can obtain insights about the data, such as retrieving events from an index, calculating metrics, searching for specific conditions within a rolling time window, identifying patterns in the data, and predicting future trends, among other examples. To achieve greater efficiency, the search system 660 can apply map-reduce methods to parallelize searching of large volumes of data. Additionally, because the original data is available, the search system 660 can apply a schema to the data at search time. This allows different structures to be applied to the same data, or for the structure to be modified if or when the content of the data changes. Application of a schema at search time may be referred to herein as a late-binding schema technique.

The user interface system 614 provides mechanisms through which users associated with the computing environment 600 (and possibly others) can interact with the data intake and query system 610. These interactions can include configuration, administration, and management of the indexing system 620, initiation and/or scheduling of queries to the search system 660, receipt or reporting of search results, and/or visualization of search results. The user interface system 614 can include, for example, facilities to provide a command line interface or a web-based interface.

Users can access the user interface system 614 using a computing device 604 that communicates with data intake and query system 610, possibly over a network. A "user," in the context of the implementations and examples described herein, is a digital entity that is described by a set of information in a computing environment. The set of information can include, for example, a user identifier, a username, a password, a user account, a set of authentication credentials, a token, other data, and/or a combination of the preceding. Using the digital entity that is represented by a user, a person can interact with the computing environment 600. For example, a person can log in as a particular user and, using the user's digital information, can access the data intake and query system 610. A user can be associated with one or more people, meaning that one or more people may be able to use the same user's digital information. For example, an administrative user account may be used by multiple people who have been given access to the administrative user account. Alternatively or additionally, a user can be associated with another digital entity, such as a bot (e.g., a software program that can perform autonomous tasks). A user can also be associated with one or more entities. For example, a company can have associated with it a number of users. In this example, the company may control the users' digital information, including assignment of user identifiers, management of security credentials, control of which persons are associated with which users, and so on.

The computing device 604 can provide a human-machine interface through which a person can have a digital presence in the computing environment 600 in the form of a user. The computing device 604 is an electronic device having one or more processors and a memory capable of storing instructions for execution by the one or more processors. The computing device 604 can further include input/output (I/O) hardware and a network interface. Applications executed by the computing device 604 can include a network access application 606, which can a network interface of the client computing device 604 to communicate, over a network, with the user interface system 614 of the data intake and query system 610. The user interface system 614 can use the network access application 606 to generate user interfaces that enable a user to interact with the data intake and query system 610. A web browser is one example of a network access application. A shell tool can also be used as a network access application. In some examples, the data intake and query system 610 is an application executing on the computing device 604. In such examples, the network access application 606 can access the user interface system 614 without needed to go over a network.

The data intake and query system 610 can optionally include apps 612. An app of the data intake and query system 610 is a collection of configurations, knowledge objects (a user-defined entity that enriches the data in the data intake and query system 610), views, and dashboards that may provide additional functionality, different techniques for searching the data, and/or additional insights into the data. The data intake and query system 610 can execute multiple applications simultaneously. Example applications include an information technology service intelligence application, which can monitor and analyze the performance and behavior of the computing environment 600, and an enterprise security application, which can include content and searches to assist security analysts in diagnosing and acting on anomalous or malicious behavior in the computing environment 600.

Though FIG. 6 illustrates only one data source, in practical implementations, the computing environment 600 contains many data sources spread across numerous computing devices. The computing devices may be controlled and operated by a single entity. For example, in an "on the premises" or "on-prem" implementation, the computing devices may physically and digitally be controlled by one entity, meaning that the computing devices are in physical locations that are owned and/or operated by the entity and are within a network domain that is controlled by the entity. In an entirely on-prem implementation of the computing environment 600, the data intake and query system 610 executes on an on-prem computing device and obtains machine data from on-prem data sources. An on-prem implementation can also be referred to as an "enterprise" network, though the term "on-prem" refers primarily to physical locality of a network and who controls that location while the term "enterprise" may be used to refer to the network of a single entity. As such, an enterprise network could include cloud components.

"Cloud" or "in the cloud" refers to a network model in which an entity operates network resources (e.g., processor capacity, network capacity, storage capacity, etc.), located for example in a data center, and makes those resources available to users and/or other entities over a network. A "private cloud" is a cloud implementation where the entity provides the network resources only to its own users. A "public cloud" is a cloud implementation where an entity operates network resources in order to provide them to users that are not associated with the entity and/or to other entities. In this implementation, the provider entity can, for example, allow a subscriber entity to pay for a subscription that enables users associated with subscriber entity to access a certain amount of the provider entity's cloud resources, possibly for a limited time. A subscriber entity of cloud resources can also be referred to as a tenant of the provider entity. Users associated with the subscriber entity access the cloud resources over a network, which may include the public Internet. In contrast to an on-prem implementation, a subscriber entity does not have physical control of the computing devices that are in the cloud and has digital access to resources provided by the computing devices only to the extent that such access is enabled by the provider entity.

In some implementations, the computing environment 600 can include on-prem and cloud-based computing resources, or only cloud-based resources. For example, an entity may have on-prem computing devices and a private cloud. In this example, the entity operates the data intake and query system 610 and can choose to execute the data intake and query system 610 on an on-prem computing device or in the cloud. In another example, a provider entity operates the data intake and query system 610 in a public cloud and provides the functionality of the data intake and query system 610 as a service, for example under a Software-as-a-Service (SaaS) model. In this example, the provider entity can provision a separate tenant (or possibly multiple tenants) in the public cloud network for each subscriber entity, where each tenant executes a separate and distinct instance of the data intake and query system 610. In some implementations, the entity providing the data intake and query system 610 is itself subscribing to the cloud services of a cloud service provider. As an example, a first entity provides computing resources under a public cloud service model, a second entity subscribes to the cloud services of the first provider entity and uses the cloud computing resources to operate the data intake and query system 610, and a third entity can subscribe to the services of the second provider entity in order to use the functionality of the data intake and query system 610. In this example, the data sources are associated with the third entity, users accessing the data intake and query system 610 are associated with the third entity, and the analytics and insights provided by the data intake and query system 610 are for purposes of the third entity's operations.

Figure 7:
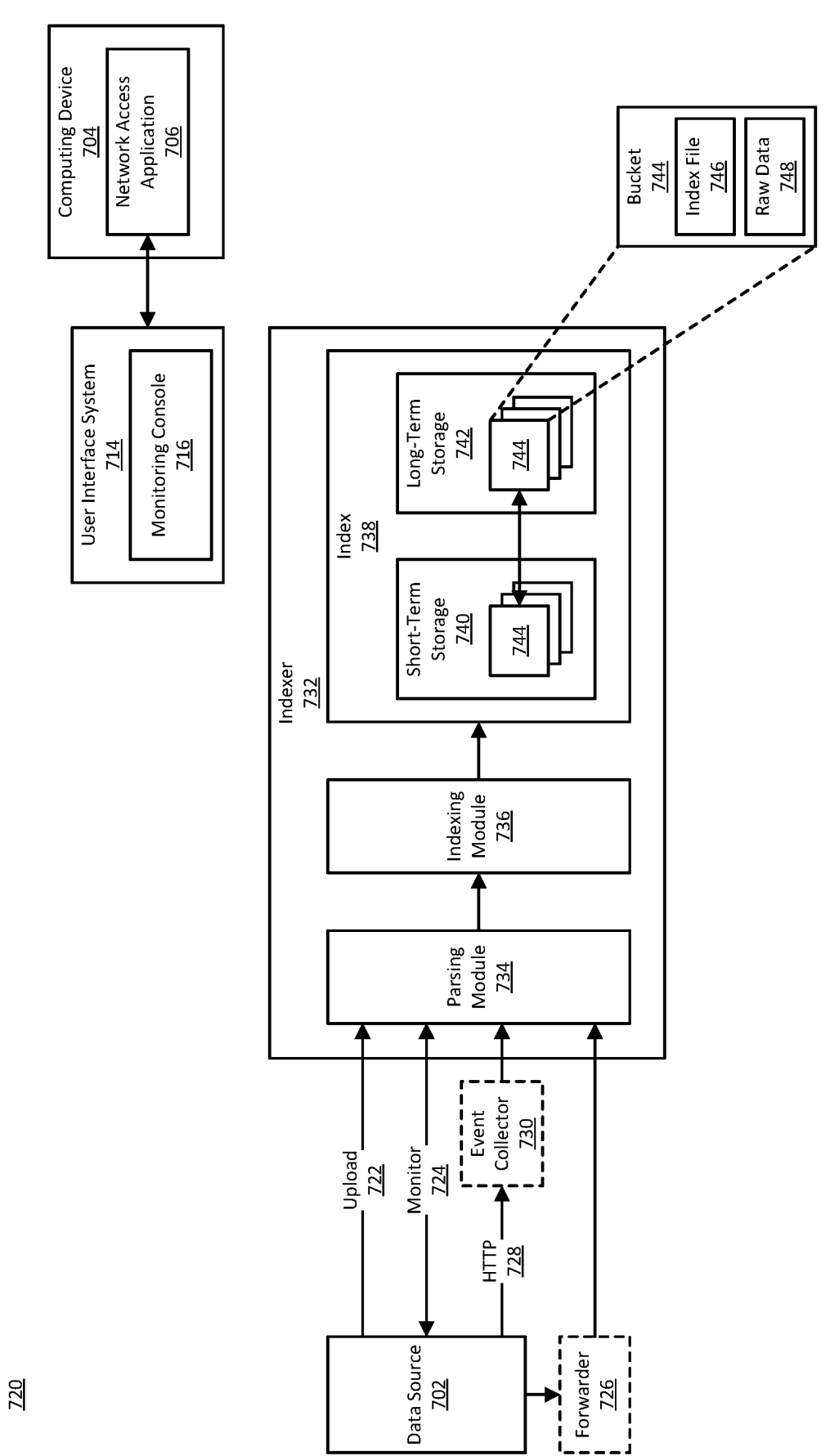
FIG. 7 is a block diagram illustrating in greater detail an example of an indexing system of a data intake and query system according to some examples.

FIG. 7 is a block diagram illustrating in greater detail an example of an indexing system 720 of a data intake and query system, such as the data intake and query system 610 of FIG. 6. The indexing system 720 of FIG. 7 uses various methods to obtain machine data from a data source 702 and stores the data in an index 738 of an indexer 732. As discussed previously, a data source is a hardware, software, physical, and/or virtual component of a computing device that produces machine data in an automated fashion and/or as a result of user interaction. Examples of data sources include files and directories; network event logs; operating system logs, operational data, and performance monitoring data; metrics; first-in, first-out queues; scripted inputs; and modular inputs, among others. The indexing system 720 enables the data intake and query system to obtain the machine data produced by the data source 702 and to store the data for searching and retrieval.

Users can administer the operations of the indexing system 720 using a computing device 704 that can access the indexing system 720 through a user interface system 714 of the data intake and query system. For example, the computing device 704 can be executing a network access application 706, such as a web browser or a terminal, through which a user can access a monitoring console 716 provided by the user interface system 714. The monitoring console 716 can enable operations such as: identifying the data source 702 for indexing; configuring the indexer 732 to index the data from the data source 702; configuring a data ingestion method; configuring, deploying, and managing clusters of indexers; and viewing the topology and performance of a deployment of the data intake and query system, among other operations. The operations performed by the indexing system 720 may be referred to as "index time" operations, which are distinct from "search time" operations that are discussed further below.

The indexer 732, which may be referred to herein as a data indexing component, coordinates and performs most of the index time operations. The indexer 732 can be implemented using program code that can be executed on a computing device. The program code for the indexer 732 can be stored on a non-transitory computer-readable medium (e.g., a magnetic, optical, or solid state storage disk, a flash memory, or another type of non-transitory storage media), and from this medium can be loaded or copied to the memory of the computing device. One or more hardware processors of the computing device can read the program code from the memory and execute the program code in order to implement the operations of the indexer 732. In some implementations, the indexer 732 executes on the computing device 704 through which a user can access the indexing system 720. In some implementations, the indexer 732 executes on a different computing device.

The indexer 732 may be executing on the computing device that also provides the data source 702 or may be executing on a different computing device. In implementations wherein the indexer 732 is on the same computing device as the data source 702, the data produced by the data source 702 may be referred to as "local data." In other implementations the data source 702 is a component of a first computing device and the indexer 732 executes on a second computing device that is different from the first computing device. In these implementations, the data produced by the data source 702 may be referred to as "remote data." In some implementations, the first computing device is "on-prem" and in some implementations the first computing device is "in the cloud." In some implementations, the indexer 732 executes on a computing device in the cloud and the operations of the indexer 732 are provided as a service to entities that subscribe to the services provided by the data intake and query system.

For a given data produced by the data source 702, the indexing system 720 can be configured to use one of several methods to ingest the data into the indexer 732. These methods include upload 722, monitor 724, using a forwarder 726, or using HyperText Transfer Protocol (HTTP 728) and an event collector 730. These and other methods for data ingestion may be referred to as "getting data in" (GDI) methods.

Using the upload 722 method, a user can instruct the indexing system 620 to specify a file for uploading into the indexer 732. For example, the monitoring console 716 can include commands or an interface through which the user can specify where the file is located (e.g., on which computing device and/or in which directory of a file system) and the name of the file. Once uploading is initiated, the indexer 732 processes the file, as discussed further below. Uploading is a manual process and occurs when instigated by a user. For automated data ingestion, the other ingestion methods are used.

The monitor 724 method enables the indexing system 620 to monitor the data source 702 and continuously or periodically obtain data produced by the data source 702 for ingestion by the indexer 732. For example, using the monitoring console 716, a user can specify a file or directory for monitoring. In this example, the indexing system 620 can execute a monitoring process that detects whenever data is added to the file or directory and causes the data to be sent to the indexer 732. As another example, a user can specify a network port for monitoring. In this example, a monitoring process can capture data received at or transmitting from the network port and cause the data to be sent to the indexer 732. In various examples, monitoring can also be configured for data sources such as operating system event logs, performance data generated by an operating system, operating system registries, operating system directory services, and other data sources.

Monitoring is available when the data source 702 is local to the indexer 732 (e.g., the data source 702 is on the computing device where the indexer 732 is executing). Other data ingestion methods, including forwarding and the event collector 730, can be used for either local or remote data sources.

A forwarder 726, which may be referred to herein as a data forwarding component, is a software process that sends data from the data source 702 to the indexer 732. The forwarder 726 can be implemented using program code that can be executed on the computer device that provides the data source 702. A user launches the program code for the forwarder 726 on the computing device that provides the data source 702. The user can further configure the program code, for example to specify a receiver for the data being forwarded (e.g., one or more indexers, another forwarder, and/or another recipient system), to enable or disable data forwarding, and to specify a file, directory, network events, operating system data, or other data to forward, among other operations.

The forwarder 726 can provide various capabilities. For example, the forwarder 726 can send the data unprocessed or can perform minimal processing on the data. Minimal processing can include, for example, adding metadata tags to the data to identify a source, source type, and/or host, among other information, dividing the data into blocks, and/or applying a timestamp to the data. In some implementations, the forwarder 726 can break the data into individual events (event generation is discussed further below) and send the events to a receiver. Other operations that the forwarder 726 may be configured to perform include buffering data, compressing data, and using secure protocols for sending the data, for example.

Forwarders can be configured in various topologies. For example, multiple forwarders can send data to the same indexer. As another example, a forwarder can be configured to filter and/or route events to specific receivers (e.g., different indexers), and/or discard events. As another example, a forwarder can be configured to send data to another forwarder, or to a receiver that is not an indexer or a forwarder (such as, for example, a log aggregator).

The event collector 730 provides an alternate method for obtaining data from the data source 702. The event collector 730 enables data and application events to be sent to the indexer 732 using HTTP 728. The event collector 730 can be implemented using program code that can be executing on a computing device. The program code may be a component of the data intake and query system or can be a standalone component that can be executed independently of the data intake and query system and operates in cooperation with the data intake and query system.

To use the event collector 730, a user can, for example using the monitoring console 716 or a similar interface provided by the user interface system 714, enable the event collector 730 and configure an authentication token. In this context, an authentication token is a piece of digital data generated by a computing device, such as a server, that contains information to identify a particular entity, such as a user or a computing device, to the server. The token will contain identification information for the entity (e.g., an alphanumeric string that is unique to each token) and a code that authenticates the entity with the server. The token can be used, for example, by the data source 702 as an alternative method to using a username and password for authentication.

To send data to the event collector 730, the data source 702 is supplied with a token and can then send HTTP 728 requests to the event collector 730. To send HTTP 728 requests, the data source 702 can be configured to use an HTTP client and/or to use logging libraries such as those supplied by Java™, JavaScript™, and .NET libraries. An HTTP client enables the data source 702 to send data to the event collector 730 by supplying the data, and a Uniform Resource Identifier (URI) for the event collector 730 to the HTTP client. The HTTP client then handles establishing a connection with the event collector 730, transmitting a request containing the data, closing the connection, and receiving an acknowledgment if the event collector 730 sends one. Logging libraries enable HTTP 728 requests to the event collector 730 to be generated directly by the data source. For example, an application can include or link a logging library, and through functionality provided by the logging library manage establishing a connection with the event collector 730, transmitting a request, and receiving an acknowledgement.

An HTTP 728 request to the event collector 730 can contain a token, a channel identifier, event metadata, and/or event data. The token authenticates the request with the event collector 730. The channel identifier, if available in the indexing system 720, enables the event collector 730 to segregate and keep separate data from different data sources. The event metadata can include one or more key-value pairs that describe the data source 702 or the event data included in the request. For example, the event metadata can include key-value pairs specifying a timestamp, a hostname, a source, a source type, or an index where the event data should be indexed. The event data can be a structured data object, such as a JavaScript™ Object Notation (JSON) object, or raw text. The structured data object can include both event data and event metadata. Additionally, one request can include event data for one or more events.

In some implementations, the event collector 730 extracts events from HTTP 728 requests and sends the events to the indexer 732. The event collector 730 can further be configured to send events or event data to one or more indexers. Extracting the events can include associating any metadata in a request with the event or events included in the request. In these implementations, event generation by the indexer 732 (discussed further below) is bypassed, and the indexer 732 moves the events directly to indexing. In some implementations, the event collector 730 extracts event data from a request and outputs the event data to the indexer 732, and the indexer generates events from the event data. In some implementations, the event collector 730 sends an acknowledgement message to the data source 702 to indicate that the event collector 730 has received a particular request form the data source 702, and/or to indicate to the data source 702 that events in the request have been added to an index.

The indexer 732 ingests incoming data and transforms the data into searchable knowledge in the form of events. In the data intake and query system, an event is a single piece of data that represents activity of the component represented in FIG. 7 by the data source 702. An event can be, for example, a single record in a log file that records a single action performed by the component (e.g., a user login, a disk read, transmission of a network packet, etc.). An event includes one or more fields that together describe the action captured by the event, where a field is a key-value pair (also referred to as a name-value pair). In some cases, an event includes both the key and the value, and in some cases the event includes only the value and the key can be inferred or assumed.

Transformation of data into events can include event generation and event indexing. Event generation includes identifying each discrete piece of data that represents one event and associating each event with a timestamp and possibly other information (which may be referred to herein as metadata). Event indexing includes storing of each event in the data structure of an index. As an example, the indexer 732 can include a parsing module 734 and an indexing module 736 for generating and storing the events. The parsing module 734 and indexing module 736 can be modular and pipelined, such that one component can be operating on a first set of data while the second component is simultaneously operating on a second sent of data. Additionally, the indexer 732 may at any time have multiple instances of the parsing module 734 and indexing module 736, with each set of instances configured to simultaneously operate on data from the same data source or from different data sources. The parsing module 734 and indexing module 736 are illustrated to facilitate discussion, with the understanding that implementations with other components are possible to achieve the same functionality.

The parsing module 734 determines information about event data, where the information can be used to identify events within the event data. For example, the parsing module 734 can associate a source type with the event data. A source type identifies the data source 702 and describes a possible data structure of event data produced by the data source 702. For example, the source type can indicate which fields to expect in events generated at the data source 702 and the keys for the values in the fields, and possibly other information such as sizes of fields, an order of the fields, a field separator, and so on. The source type of the data source 702 can be specified when the data source 702 is configured as a source of event data. Alternatively, the parsing module 734 can determine the source type from the event data, for example from an event field or using machine learning.

Other information that the parsing module 734 can determine includes timestamps. In some cases, an event includes a timestamp as a field, and the timestamp indicates a point in time when the action represented by the event occurred or was recorded by the data source 702 as event data. In these cases, the parsing module 734 may be able to determine from the source type associated with the event data that the timestamps can be extracted from the events themselves. In some cases, an event does not include a timestamp and the parsing module 734 determines a timestamp for the event, for example from a name associated with the event data from the data source 702 (e.g., a file name when the event data is in the form of a file) or a time associated with the event data (e.g., a file modification time). As another example, when the parsing module 734 is not able to determine a timestamp from the event data, the parsing module 734 may use the time at which it is indexing the event data. As another example, the parsing module 734 can use a user-configured rule to determine the timestamps to associate with events.

The parsing module 734 can further determine event boundaries. In some cases, a single line (e.g., a sequence of characters ending with a line termination) in event data represents one event while in other cases, a single line represents multiple events. In yet other cases, one event may span multiple lines within the event data. The parsing module 734 may be able to determine event boundaries from the source type associated with the event data, for example from a data structure indicated by the source type. In some implementations, a user can configure rules the parsing module 734 can use to identify event boundaries.

The parsing module 734 can further extract data from events and possibly also perform transformations on the events. For example, the parsing module 734 can extract a set of fields for each event, such as a host or hostname, source or source name, and/or source type. The parsing module 734 may extract certain fields by default or based on a user configuration. Alternatively or additionally, the parsing module 734 may add fields to events, such as a source type or a user-configured field. As another example of a transformation, the parsing module 734 can anonymize fields in events to mask sensitive information, such as social security numbers or account numbers. Anonymizing fields can include changing or replacing values of specific fields. The parsing component 734 can further perform user-configured transformations.

The parsing module 734 outputs the results of processing incoming event data to the indexing module 736, which performs event segmentation and builds index data structures.

Event segmentation identifies searchable segments, which may alternatively be referred to as searchable terms or keywords, which can be used by the search system of the data intake and query system to search the event data. A searchable segment may be a part of a field in an event or an entire field. The indexer 732 can be configured to identify searchable segments that are parts of fields, searchable segments that are entire fields, or both. The parsing module 734 organizes the searchable segments into a lexicon or dictionary for the event data, with the lexicon including each searchable segment and a reference to the location of each occurrence of the searchable segment within the event data. As discussed further below, the search system can use the lexicon, which is stored in an index file 746, to find event data that matches a search query. In some implementations, segmentation can alternatively be performed by the forwarder 726. Segmentation can also be disabled, in which case the indexer 732 will not build a lexicon for the event data. When segmentation is disabled, the search system searches the event data directly.

Building index data structures generates the index 738. The index 738 is a storage data structure on a storage device (e.g., a disk drive or other physical device for storing digital data). The storage device may be a component of the computing device on which the indexer 732 is operating (referred to herein as local storage) or may be a component of a different computing device (referred to herein as remote storage) that the indexer 738 has access to over a network. The indexer 732 can include more than one index and can include indexes of different types. For example, the indexer 732 can include event indexes, which impose minimal structure on stored data and can accommodate any type of data. As another example, the indexer 732 can include metrics indexes, which use a highly structured format to handle the higher volume and lower latency demands associated with metrics data.

The indexing module 736 organizes files in the index 738 in directories referred to as buckets. The files in a bucket 744 can include raw data files, index files, and possibly also other metadata files. As used herein, "raw data" means data as when the data was produced by the data source 702, without alteration to the format or content. As noted previously, the parsing component 734 may add fields to event data and/or perform transformations on fields in the event data, and thus a raw data file 748 can include, in addition to or instead of raw data, what is referred to herein as enriched raw data. The raw data file 748 may be compressed to reduce disk usage. An index file 746, which may also be referred to herein as a "time-series index" or tsidx file, contains metadata that the indexer 732 can use to search a corresponding raw data file 748. As noted above, the metadata in the index file 746 includes a lexicon of the event data, which associates each unique keyword in the event data in the raw data file 748 with a reference to the location of event data within the raw data file 748. The keyword data in the index file 746 may also be referred to as an inverted index. In various implementations, the data intake and query system can use index files for other purposes, such as to store data summarizations that can be used to accelerate searches.

A bucket 744 includes event data for a particular range of time. The indexing module 736 arranges buckets in the index 738 according to the age of the buckets, such that buckets for more recent ranges of time are stored in short-term storage 740 and buckets for less recent ranges of time are stored in long-term storage 742. Short-term storage 740 may be faster to access while long-term storage 742 may be slower to access. Buckets may move from short-term storage 740 to long-term storage 742 according to a configurable data retention policy, which can indicate at what point in time a bucket is old enough to be moved.

A bucket's location in short-term storage 740 or long-term storage 742 can also be indicated by the bucket's status. As an example, a bucket's status can be "hot," "warm," "cold," "frozen," or "thawed." In this example, hot bucket is one to which the indexer 732 is writing data and the bucket becomes a warm bucket when the indexer 732 stops writing data to it. In this example, both hot and warm buckets reside in short-term storage 740. Continuing this example, when a warm bucket is moved to long-term storage 742, the bucket becomes a cold bucket. A cold bucket can become a frozen bucket after a period of time, at which point the bucket may be deleted or archived. An archived bucket cannot be searched. When an archived bucket is retrieved for searching, the bucket becomes thawed and can then be searched.

The indexing system 720 can include more than one indexer, where a group of indexers is referred to as an index cluster. The indexers in an index cluster may also be referred to as peer nodes. In an index cluster, the indexers are configured to replicate each other's data by copying buckets from one indexer to another. The number of copies of a bucket can configured (e.g., three copies of each bucket must exist within the cluster), and indexers to which buckets are copied may be selected to optimize distribution of data across the cluster.

A user can view the performance of the indexing system 720 through the monitoring console 716 provided by the user interface system 714. Using the monitoring console 716, the user can configure and monitor an index cluster, and see information such as disk usage by an index, volume usage by an indexer, index and volume size over time, data age, statistics for bucket types, and bucket settings, among other information.

Figure 8:
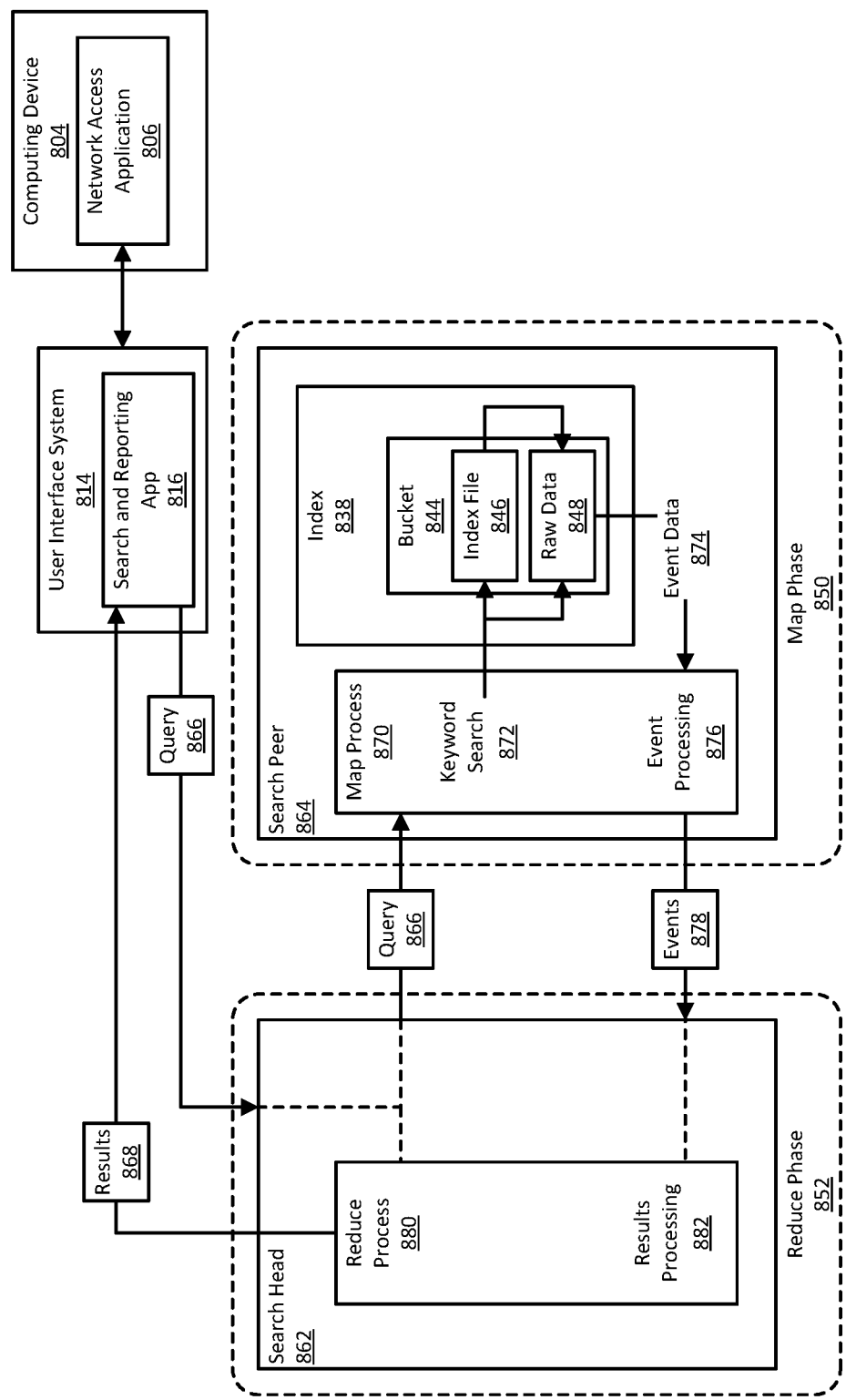
FIG. 8 is a block diagram illustrating in greater detail an example of the search system of a data intake and query system according to some examples.

FIG. 8 is a block diagram illustrating in greater detail an example of the search system 860 of a data intake and query system, such as the data intake and query system 610 of FIG. 6. The search system 860 of FIG. 8 issues a query 866 to a search head 862, which sends the query 866 to a search peer 864. Using a map process 870, the search peer 864 searches the appropriate index 838 for events identified by the query 866 and sends events 878 so identified back to the search head 862. Using a reduce process 880, the search head 862 processes the events 878 and produces results 868 to respond to the query 866. The results 868 can provide useful insights about the data stored in the index 838. These insights can aid in the administration of information technology systems, in security analysis of information technology systems, and/or in analysis of the development environment provided by information technology systems.

The query 866 that initiates a search is produced by a search and reporting app 816 that is available through the user interface system 814 of the data intake and query system. Using a network access application 806 executing on a computing device 804, a user can input the query 866 into a search field provided by the search and reporting app 816. Alternatively or additionally, the search and reporting app 816 can include pre-configured queries or stored queries that can be activated by the user. In some cases, the search and reporting app 816 initiates the query 866 when the user enters the query 866. In these cases, the query 866 may be referred to as an "ad-hoc" query. In some cases, the search and reporting app 816 initiates the query 866 based on a schedule. For example, the search and reporting app 816 can be configured to execute the query 866 once per hour, once per day, at a specific time, on a specific date, or at some other time that can be specified by a date, time, and/or frequency. These types of queries may be referred to as scheduled queries.

The query 866 is specified using a search processing language. The search processing language includes commands that the search peer 864 will use to identify events to return in the search results 868. The search processing language can further include commands for filtering events, extracting more information from events, evaluating fields in events, aggregating events, calculating statistics over events, organizing the results, and/or generating charts, graphs, or other visualizations, among other examples. Some search commands may have functions and arguments associated with them, which can, for example, specify how the commands operate on results and which fields to act upon. The search processing language may further include constructs that enable the query 866 to include sequential commands, where a subsequent command may operate on the results of a prior command. As an example, sequential commands may be separated in the query 866 by a vertical line ("|" or "pipe") symbol.

In addition to one or more search commands, the query 866 includes a time indicator. The time indicator limits searching to events that have timestamps described by the indicator. For example, the time indicator can indicate a specific point in time (e.g., 10:00:00 am today), in which case only events that have the point in time for their timestamp will be searched. As another example, the time indicator can indicate a range of time (e.g., the last 24 hours), in which case only events whose timestamps fall within the range of time will be searched. The time indicator can alternatively indicate all of time, in which case all events will be searched.

Processing of the search query 866 occurs in two broad phases: a map phase 850 and a reduce phase 852. The map phase 850 takes place across one or more search peers. In the map phase 850, the search peers locate event data that matches the search terms in the search query 866 and sorts the event data into field-value pairs. When the map phase 850 is complete, the search peers send events that they have found to one or more search heads for the reduce phase 852. During the reduce phase 852, the search heads process the events through commands in the search query 866 and aggregate the events to produce the final search results 868.

A search head, such as the search head 862 illustrated in FIG. 8, is a component of the search system 860 that manages searches. The search head 862, which may also be referred to herein as a search management component, can be implemented using program code that can be executed on a computing device. The program code for the search head 862 can be stored on a non-transitory computer-readable medium and from this medium can be loaded or copied to the memory of a computing device. One or more hardware processors of the computing device can read the program code from the memory and execute the program code in order to implement the operations of the search head 862.

Upon receiving the search query 866, the search head 862 directs the query 866 to one or more search peers, such as the search peer 864 illustrated in FIG. 8. "Search peer" is an alternate name for "indexer" and a search peer may be largely similar to the indexer described previously. The search peer 864 may be referred to as a "peer node" when the search peer 864 is part of an indexer cluster. The search peer 864, which may also be referred to as a search execution component, can be implemented using program code that can be executed on a computing device. In some implementations, one set of program code implements both the search head 862 and the search peer 864 such that the search head 862 and the search peer 864 form one component. In some implementations, the search head 862 is an independent piece of code that performs searching and no indexing functionality. In these implementations, the search head 862 may be referred to as a dedicated search head.

The search head 862 may consider multiple criteria when determining whether to send the query 866 to the particular search peer 864. For example, the search system 860 may be configured to include multiple search peers that each have duplicative copies of at least some of the event data. In this example, the sending the search query 866 to more than one search peer allows the search system 860 to distribute the search workload across different hardware resources. As another example, search system 860 may include different search peers for different purposes (e.g., one has an index storing a first type of data or from a first data source while a second has an index storing a second type of data or from a second data source). In this example, the search query 866 may specify which indexes to search, and the search head 862 will send the query 866 to the search peers that have those indexes.

To identify events 878 to send back to the search head 862, the search peer 864 performs a map process 870 to obtain event data 874 from the index 838 that is maintained by the search peer 864. During a first phase of the map process 870, the search peer 864 identifies buckets that have events that are described by the time indicator in the search query 866. As noted above, a bucket contains events whose timestamps fall within a particular range of time. For each bucket 844 whose events can be described by the time indicator, during a second phase of the map process 870, the search peer 864 performs a keyword search 872 using search terms specified in the search query 866. The search terms can be one or more of keywords, phrases, fields, Boolean expressions, and/or comparison expressions that in combination describe events being searched for. When segmentation is enabled at index time, the search peer 864 performs the keyword search 872 on the bucket's index file 846. As noted previously, the index file 846 includes a lexicon of the searchable terms in the events stored in the bucket's raw data 848 file. The keyword search 872 searches the lexicon for searchable terms that correspond to one or more of the search terms in the query 866. As also noted above, the lexicon incudes, for each searchable term, a reference to each location in the raw data 848 file where the searchable term can be found. Thus, when the keyword search identifies a searchable term in the index file 846 that matches query 866, the search peer 864 can use the location references to extract from the raw data 848 file the event data 874 for each event that include the searchable term.

In cases where segmentation was disabled at index time, the search peer 864 performs the keyword search 872 directly on the raw data 848 file. To search the raw data 848, the search peer 864 may identify searchable segments in events in a similar manner as when the data was indexed. Thus, depending on how the search peer 864 is configured, the search peer 864 may look at event fields and/or parts of event fields to determine whether an event matches the query 866. Any matching events can be added to the event data 874 read from the raw data 848 file. The search peer 864 can further be configured to enable segmentation at search time, so that searching of the index 838 causes the search peer 864 to build a lexicon in the index file 846.

The event data 874 obtained from the raw data 848 file includes the full text of each event found by the keyword search 872. During a third phase of the map process 870, the search peer 864 performs event processing 876 on the event data 874, with the steps performed being determined by the configuration of the search peer 864 and/or commands in the search query 866. For example, the search peer 864 can be configured to perform field discovery and field extraction. Field discovery is a process by which the search peer 864 identifies and extracts key-value pairs from the events in the event data 874. The search peer 864 can, for example, be configured to automatically extract the first 100 fields (or another number of fields) in the event data 874 that can be identified as key-value pairs. As another example, the search peer 864 can extract any fields explicitly mentioned in the search query 866. The search peer 864 can, alternatively or additionally, be configured with particular field extractions to perform.

Other examples of steps that can be performed during event processing 876 include: field aliasing (assigning an alternate name to a field); addition of fields from lookups (adding fields from an external source to events based on existing field values in the events); associating event types with events; source type renaming (changing the name of the source type associated with particular events); and tagging (adding one or more strings of text, or a "tags" to particular events), among other examples.

The search peer 864 sends processed events 878 to the search head 862, which performs a reduce process 880. The reduce process 880 potentially receives events from multiple search peers and performs various results processing 882 steps on the events. The results processing 882 steps can include, for example, aggregating the events from different search peers into a single set of events, deduplicating and aggregating fields discovered by different search peers, counting the number of events found, and sorting the events by timestamp (e.g., newest first or oldest first), among other examples. Results processing 882 can further include applying commands from the search query 866 to the events. The query 866 can include, for example, commands for evaluating and/or manipulating fields (e.g., to generate new fields from existing fields or parse fields that have more than one value). As another example, the query 866 can include commands for calculating statistics over the events, such as counts of the occurrences of fields, or sums, averages, ranges, and so on, of field values. As another example, the query 866 can include commands for generating statistical values for purposes of generating charts of graphs of the events.

Through results processing 882, the reduce process 880 produces the events found by processing the search query 866, as well as some information about the events, which the search head 862 outputs to the search and reporting app 816 as search results 868. The search and reporting app 816 can generate visual interfaces for viewing the search results 868. The search and reporting app 816 can, for example, output visual interfaces for the network access application 806 running on a computing device 804 to generate.

The visual interfaces can include various visualizations of the search results 868, such as tables, line or area charts, Choropleth maps, or single values. The search and reporting app 816 can organize the visualizations into a dashboard, where the dashboard includes a panel for each visualization. A dashboard can thus include, for example, a panel listing the raw event data for the events in the search results 868, a panel listing fields extracted at index time and/or found through field discovery along with statistics for those fields, and/or a timeline chart indicating how many events occurred at specific points in time (as indicated by the timestamps associated with each event). In various implementations, the search and reporting app 816 can provide one or more default dashboards. Alternatively or additionally, the search and reporting app 816 can include functionality that enables a user to configure custom dashboards.

The search and reporting app 816 can also enable further investigation into the events in the search results 868. The process of further investigation may be referred to as drill-down. For example, a visualization in a dashboard can include interactive elements, which, when selected, provide options for finding out more about the data being displayed by the interactive elements. To find out more, an interactive element can, for example, generate a new search that includes some of the data being displayed by the interactive element, and thus may be more focused than the initial search query 866. As another example, an interactive element can launch a different dashboard whose panels include more detailed information about the data that is displayed by the interactive element. Other examples of actions that can be performed by interactive elements in a dashboard include opening a link, playing an audio or video file, or launching another application, among other examples.

Figure 9:
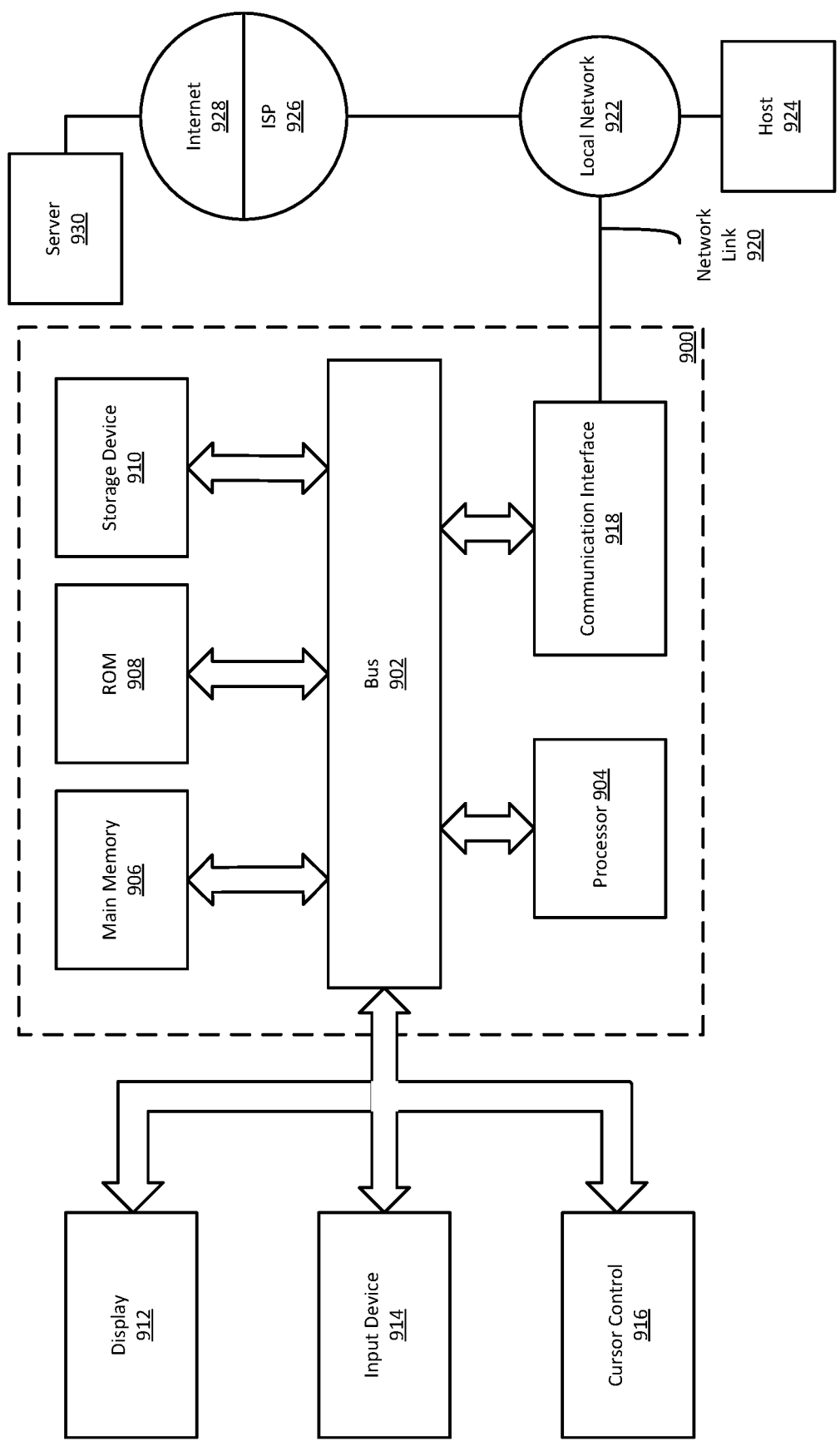
FIG. 9 is a block diagram illustrating an example computer system that may be used in some embodiments.

FIG. 9 is a block diagram that illustrates a computer system 900 utilized in implementing the above-described techniques, according to an example. Computer system 900 may be, for example, a desktop computing device, laptop computing device, tablet, smartphone, server appliance, computing mainframe, multimedia device, handheld device, networking apparatus, or any other suitable device.

Computer system 900 includes one or more buses 902 or other communication mechanism for communicating information, and one or more hardware processors 904 coupled with buses 902 for processing information. Hardware processors 904 may be, for example, general purpose microprocessors. Buses 902 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 900 also includes a main memory 906, such as a random access memory (RAM) or other dynamic or volatile storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 a special-purpose machine that is customized to perform the operations specified in the instructions.

Computer system 900 further includes one or more read only memories (ROM) 908 or other static storage devices coupled to bus 902 for storing static information and instructions for processor 904. One or more storage devices 910, such as a solid-state drive (SSD), magnetic disk, optical disk, or other suitable non-volatile storage device, is provided and coupled to bus 902 for storing information and instructions.

Computer system 900 may be coupled via bus 902 to one or more displays 912 for presenting information to a computer user. For instance, computer system 900 may be connected via a High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 912 may include, without limitation, plasma display devices, projectors, cathode ray tube (CRT) monitors, electronic paper, virtual reality headsets, braille terminal, and/or any other suitable device for outputting information to a computer user. In an example, any suitable type of output device, such as, for instance, an audio speaker or printer, may be utilized instead of a display 912.

One or more input devices 914 are coupled to bus 902 for communicating information and command selections to processor 904. One example of an input device 914 is a keyboard, including alphanumeric and other keys. Another type of user input device 914 is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane. Yet other examples of suitable input devices 914 include a touch-screen panel affixed to a display 912, cameras, microphones, accelerometers, motion detectors, and/or other sensors. In an example, a network-based input device 914 may be utilized. In such an example, user input and/or other information or commands may be relayed via routers and/or switches on a Local Area Network (LAN) or other suitable shared network, or via a peer-to-peer network, from the input device 914 to a network link 920 on the computer system 900.

A computer system 900 may implement techniques described herein using customized hard-wired logic, one or more ASICs or FPGAs, firmware and/or program logic which in combination with the computer system causes or programs computer system 900 to be a special-purpose machine. According to one example, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In other examples, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or a solid state drive of a remote computer. The remote computer can load the instructions into its dynamic memory and use a modem to send the instructions over a network, such as a cable network or cellular network, as modulate signals. A modem local to computer system 900 can receive the data on the network and demodulate the signal to decode the transmitted instructions. Appropriate circuitry can then place the data on bus 902. Bus 902 carries the data to main memory 906, from which processor 904 retrieves and executes the instructions. The instructions received by main memory 906 may optionally be stored on storage device 910 either before or after execution by processor 904.

A computer system 900 may also include, in an example, one or more communication interfaces 918 coupled to bus 902. A communication interface 918 provides a data communication coupling, typically two-way, to a network link 920 that is connected to a local network 922. For example, a communication interface 918 may be an integrated services digital network (ISDN) card, cable modem, satellite modem, or a modem to provide a data communication connection to a corresponding type of telephone line. As another example, the one or more communication interfaces 918 may include a local area network (LAN) card to provide a data communication connection to a compatible LAN. As yet another example, the one or more communication interfaces 918 may include a wireless network interface controller, such as a 802.11-based controller, Bluetooth controller, Long Term Evolution (LTE) modem, and/or other types of wireless interfaces. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by a Service Provider 926. Service Provider 926, which may for example be an Internet Service Provider (ISP), in turn provides data communication services through a wide area network, such as the world-wide packet data communication network now commonly referred to as the "internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

In an example, computer system 900 can send messages and receive data, including program code and/or other types of instructions, through the network(s), network link 920, and communication interface 918. In the Internet example, a server 930 might transmit a requested code for an application program through Internet 928, ISP 926, local network 922 and communication interface 918. The received code may be executed by processor 904 as it is received, and/or stored in storage device 910, or other non-volatile storage for later execution. As another example, information received via a network link 920 may be interpreted and/or processed by a software component of the computer system 900, such as a web browser, application, or server, which in turn issues instructions based thereon to a processor 904, possibly via an operating system and/or other intermediate layers of software components.

In some examples, some or all the systems described herein may be or comprise server computer systems, including one or more computer systems 900 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

Various examples and possible implementations have been described above, which recite certain features and/or functions. Although these examples and implementations have been described in language specific to structural features and/or functions, it is understood that the subject matter defined in the appended claims is not necessarily limited to the specific features or functions described above. Rather, the specific features and functions described above are disclosed as examples of implementing the claims, and other equivalent features and acts are intended to be within the scope of the claims. Further, any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and (ii) the components of respective embodiments may be combined in any manner.

Processing of the various components of systems illustrated herein can be distributed across multiple machines, networks, and other computing resources. Two or more components of a system can be combined into fewer components. Various components of the illustrated systems can be implemented in one or more virtual machines or an isolated execution environment, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Examples have been described with reference to flow chart illustrations and/or block diagrams of methods, apparatus (systems), and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

What is claimed is:

1. A computer-implemented method comprising:
receiving, by an actions service executing in a cloud provider network, from an application associated with a data intake and query system, an application programming interface (API) request to execute an action involving a service or device that is external to the actions service, wherein the actions service implements a plurality of actions including the action and includes a modular set of applications that are executable by the actions service, wherein the modular set of applications includes a custom application, provided by a user, that defines a second action and is used to integrate the actions service with one of a plurality of services or devices external to the actions service and to interface with the one of the plurality of services or devices external to the actions service;
mapping the action to a first application of the modular set of applications and the custom application;
identifying first application code associated with the first application of the modular set of applications that, upon execution, implements a first action;
identifying second application code associated with the custom application of the modular set of applications that, upon execution, implements the second action;
identifying configuration data for the service or device associated with the action; and
aggregating a response from execution of the first application code associated with the first application to perform the first action and a response from execution of the second application code associated with the custom application to perform the second action to implement the action.

2. The computer-implemented method of claim 1, wherein the actions service adds the custom application to the modular set of applications so that the custom application is invokable by other application of the modular set of applications that are not customized.

3. The computer-implemented method of claim 1, further comprising:
sending an action run identifier to the application associated with the data intake and query system;
receiving, from the application associated with the data intake and query system, a request for status information related to execution of the action, wherein the request includes the action run identifier; and
sending a response indicating a status of execution of the action.

4. The computer-implemented method of claim 1, further comprising causing execution of the first application code to perform the first action includes sending a message to a message queue, wherein the message causes an on-demand code execution service to invoke execution of the first application code.

5. The computer-implemented method of claim 1, wherein execution of the first application code includes:
obtaining, from the service or device that is external to the actions service, results data;
storing the results data in a logical storage container; and
sending an identifier of the logical storage container to the application associated with the data intake and query system.

6. The computer-implemented method of claim 1, wherein execution of the first application code includes sending, to a message queue, a message indicating that the action has completed execution, and wherein the actions service provides an indication to the application associated with the data intake and query system that the action has completed execution based on the message.

7. The computer-implemented method of claim 1, further comprising identifying a version of the first application code to be used to perform the first action.

8. The computer-implemented method of claim 1, further comprising:
receiving a request including the configuration data to be used by the actions service to access the service or device that is external to the actions service, wherein the request is associated with a tenant of the actions service; and
storing the configuration data using a storage resource accessible to the actions service.

9. The computer-implemented method of claim 1, wherein the request is associated with a tenant of the actions service, and wherein the method further comprises:
determining that configuration data for the service or device does not exist for the tenant of the actions service;
prompting a user to provide the configuration data to be used by the actions service to access the service or device;
receiving a request including the configuration data to be used by the actions service to access the service or device that is external to the actions service, wherein the request is associated with the tenant of the actions service; and
storing the configuration data using a storage resource accessible to the actions service.

10. The computer-implemented method of claim 1, wherein the service or device is a first service or device, the API request is a first API request, the action is a first action, and wherein the method further comprises:
receiving a request identifying custom application code implementing an action involving a second service or device;
storing the custom application code;
receiving a second API request to execute a third action involving the second service or device; and
causing execution of the custom application code to perform the third action.

11. The computer-implemented method of claim 1, wherein the API request is a first API request, wherein the first API request includes one or more first action parameters to be used by the first application code to perform the first action, wherein execution of the first application code to perform the first action generates results data, and wherein the method further comprises:

storing the results data at a storage resource, wherein the results data is stored in association with the one or more first action parameters;
receiving a second API request to execute the action, wherein the second API request includes one or more second action parameters;
determining that the one or more second action parameters are the same as the one or more first action parameters; and
sending a response identifying a storage location of the results data.

12. The computer-implemented method of claim 1, further comprising:
receiving, from the application associated with the data intake and query system, a request to obtain a list of actions supported by the actions service; and
sending a response including the list of actions supported by the actions service.

13. A computing device comprising:
a processor; and
a non-transitory, computer-readable medium having stored thereon instructions that, when executed by the processor, cause the computing device to perform operations including:
receiving, by an actions service executing in a cloud provider network, from an application associated with a data intake and query system, an application programming interface (API) request to execute an action involving a service or device that is external to the actions service, wherein the actions service implements a plurality of actions including the action and includes a modular set of applications that are executable by the actions service, wherein the modular set of applications includes a custom application, provided by a user, that defines a second action and is used to integrate the actions service with one of a plurality of services or devices external to the actions service and to interface with the one of a plurality of services or devices external to the actions service;
mapping the action to a first application of the modular set of applications and the custom application;
identifying first application code associated with the first application of the modular set of applications that, upon execution, implements a first action;
identifying second application code associated with the custom application of the modular set of applications that, upon execution, implements the second action;
identifying configuration data for the service or device associated with the action; and
aggregating a response from execution of the first application code associated with the first application to perform the first action and a response from execution of the second application code associated with the custom application to perform the second action to implement the action.

14. The computing device of claim 13, wherein the actions service adds the custom application to the modular set of applications so that the custom application is invokable by other application of the modular set of applications that are not customized.

15. The computing device of claim 13, wherein the operations further include:
sending an action run identifier to the application associated with the data intake and query system;
receiving, from the application associated with the data intake and query system, a request for status information related to execution of the action, wherein the request includes the action run identifier; and
sending a response indicating a status of execution of the action.

16. The computing device of claim 13, further comprising causing execution of the first application code to perform the first action includes sending a message to a message queue, wherein the message causes an on-demand code execution service to invoke execution of the first application code.

17. A non-transitory, computer-readable medium having stored thereon instructions that, when executed by one or more processors, cause a system to perform operations comprising:
receiving, by an actions service executing in a cloud provider network, from an application associated with a data intake and query system, an application programming interface (API) request to execute an action involving a service or device that is external to the actions service, wherein the actions service implements a plurality of actions including the action and includes a modular set of applications that are executable by the actions service, wherein the modular set of applications includes a custom application, provided by a user, that defines a second action and is used to integrate the actions service with one of a plurality of services or devices external to the actions service and to interface with the one of the plurality of services or devices external to the actions service;
mapping the action to a first application of the modular set of applications and the custom application;
identifying first application code associated with the first application of the modular set of applications that, upon execution, implements a first action;
identifying second application code associated with the custom application of the modular set of applications that, upon execution, implements the second action;
identifying configuration data for the service or device associated with the action; and
aggregating a response from execution of the first application code associated with the first application to perform the first action and a response from execution of the second application code associated with the custom application to perform the second action to implement the action.

18. The computer-readable medium of claim 17, wherein the actions service adds the custom application to the modular set of applications so that the custom application is invokable by other application of the modular set of applications that are not customized.

19. The computer-readable medium of claim 17, wherein the operations further include:
sending an action run identifier to the application associated with the data intake and query system;
receiving, from the application associated with the data intake and query system, a request for status information related to execution of the action, wherein the request includes the action run identifier; and
sending a response indicating a status of execution of the action.

20. The computer-readable medium of claim 17, further comprising causing execution of the first application code to perform the first action includes sending a message to a message queue, wherein the message causes an on-demand code execution service to invoke execution of the first application code.

* * * * *